(12) United States Patent
Coomber et al.

(10) Patent No.: US 7,167,835 B2
(45) Date of Patent: Jan. 23, 2007

(54) METHOD OF PROVIDING PROJECT AND PRODUCT INFORMATION TO A PURCHASER OF FLOOR COVERING MATERIALS

(75) Inventors: Gregory P. Coomber, Herne Bay (GB); Morag Ann Girdwood, Cheadle Hulme (GB); Zahir Khan Palanpur, Smyrna, GA (US); Peter J. Kirk, LaGrange, GA (US); Judy A. Wagner, LaGrange, GA (US); C. Dean Thompson, LaGrange, GA (US); Cynthia W. Thompson, Spartanburg, SC (US); Kathy A. Revan, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 831 days.

(21) Appl. No.: 09/809,145

(22) Filed: Mar. 15, 2001

(65) Prior Publication Data
US 2002/0133430 A1    Sep. 19, 2002

(51) Int. Cl.
 *G06Q 30/00* (2006.01)
 *G06F 17/30* (2006.01)
(52) U.S. Cl. .......................................... 705/26; 705/27
(58) Field of Classification Search ............... 705/26, 705/27, 8
See application file for complete search history.

(56) References Cited

U.S. PATENT DOCUMENTS

| | | | |
|---|---|---|---|
| 5,715,399 A | 2/1998 | Bezos | 395/227 |
| 5,727,163 A | 3/1998 | Bezos | 395/227 |
| 5,960,411 A | 9/1999 | Hartman et al. | 705/26 |
| 6,029,141 A | 2/2000 | Bezos et al. | 705/27 |
| 6,064,982 A | 5/2000 | Puri | 705/27 |
| 6,167,383 A * | 12/2000 | Henson | 705/26 |
| 6,393,410 B1 * | 5/2002 | Thompson | 705/37 |
| 6,525,747 B1 | 2/2003 | Bezos | 345/751 |
| 6,606,608 B1 | 8/2003 | Bezos et al. | 705/37 |
| 2001/0028364 A1 * | 10/2001 | Fredell et al. | 345/751 |
| 2001/0049644 A1 | 12/2001 | Webb et al. | 705/27 |
| 2002/0010655 A1 | 1/2002 | Kjallstrom | 705/27 |

(Continued)

FOREIGN PATENT DOCUMENTS

JP    08030677 A    *    2/1996

OTHER PUBLICATIONS

"Yesterday's lessons, today's advanced tools, tomorrow's business success," Laurent Dubernais, Buildings, Cedar Rapids, Jun. 2001, vol. 95, Issue 6, 1 page.*
"Furniture Consultants Assist Busy Customers", *The Saturday Oklahoman*, Apr. 3, 1999.

(Continued)

*Primary Examiner*—Matthew S Gart
(74) *Attorney, Agent, or Firm*—Terry T. Moyer; Daniel R. Alexander

(57) ABSTRACT

A software and/or internet based system and method for enabling a buyer or potential buyer of floor coverings to access directly information relating to former, current and proposed future installation projects as well as information on available products. The information available is tailored to the needs of the individual requester. Global data for a customer is broadly accessible through a URL site dedicated to that customer. However, the actual scope of information available to any individual requesting data on behalf of a customer is limited to pre-authorized data elements corresponding to the scope of responsibility held by the requesting individual.

17 Claims, 38 Drawing Sheets

U.S. PATENT DOCUMENTS

| | | |
|---|---|---|
| 2002/0042755 A1 | 4/2002 | Kumar et al. ................. 705/26 |
| 2002/0052799 A1 | 5/2002 | Starikov ...................... 705/26 |
| 2002/0099617 A1 | 7/2002 | Fogelson ..................... 705/26 |
| 2002/0123941 A1* | 9/2002 | Donahue et al. .............. 705/26 |
| 2002/0123942 A1* | 9/2002 | Bridges et al. ............... 705/27 |

* cited by examiner

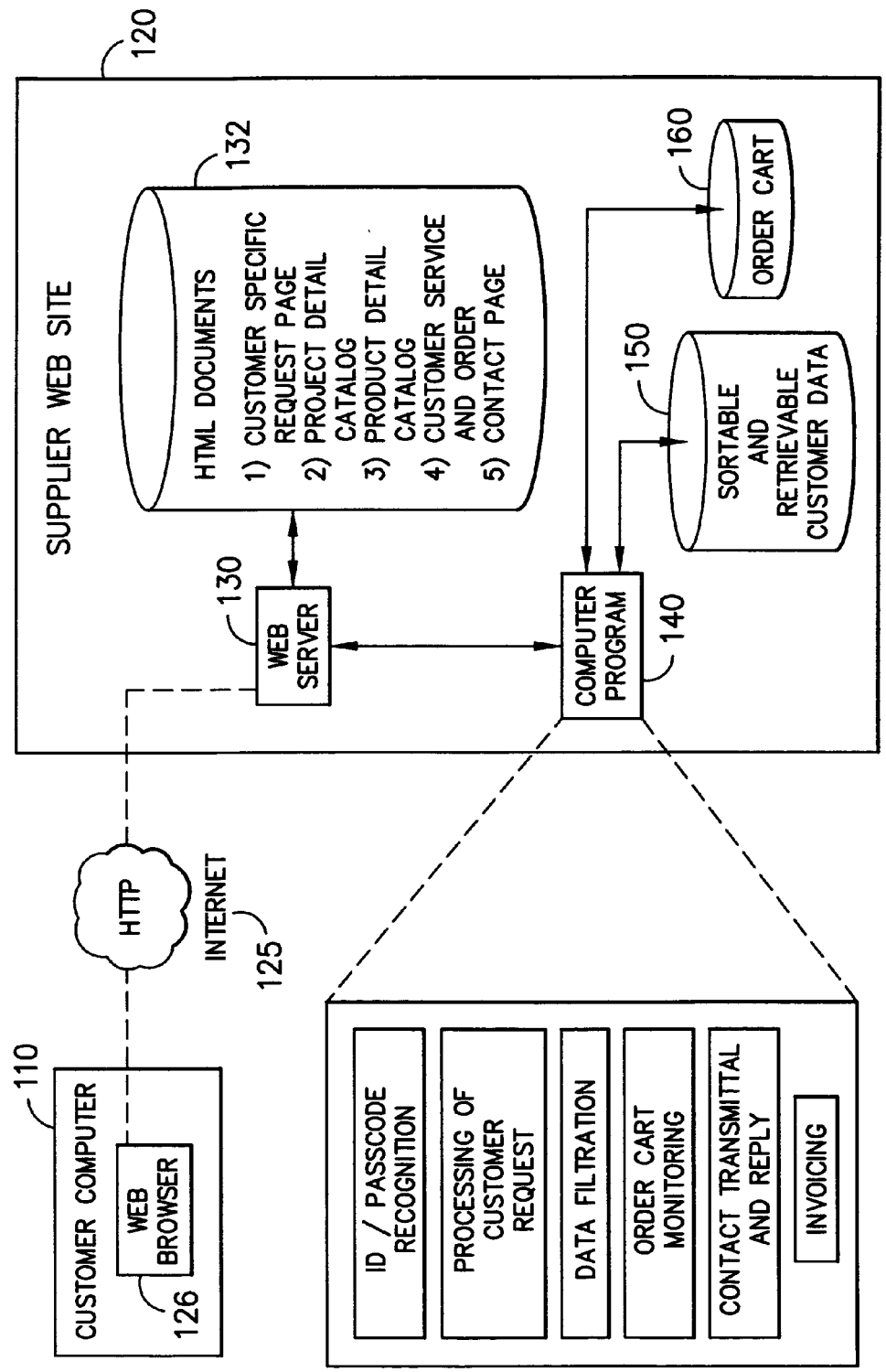
FIG. -1-

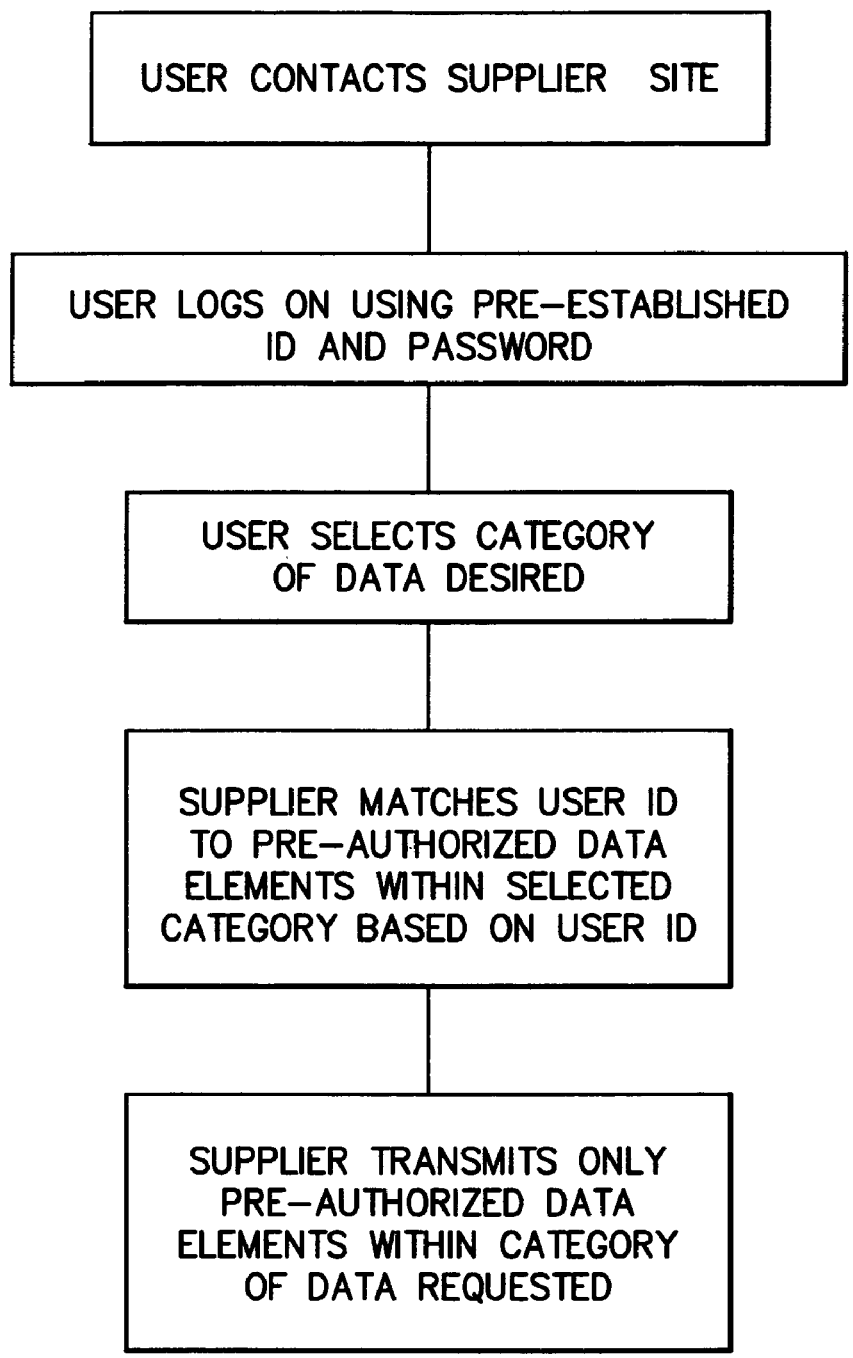
FIG. -2-

Milliken Carpet online
| Home | Projects | Products | Customer Services | Contact Us |

Welcome to the [ ] Milliken Connections Site!

This site allows for new and exciting communications between Milliken and [ ] via the internet.

To share from [ ]

"Certainly the Net is a powerful medium for communication. But even more important, it is a vocational medium - a place where real work gets done, real competitive advantage is gained, and real growth is generated"

Building [ ] is a building on the [ ] Site that has used quiet a bit of Milliken carpet in the past and will try and use some of the older product again by reusing the carpet after being processed by Milliken's Earth Square program.

Project of the month [ ]

Milliken Projects from Around the World and other great Milliken carpet projects for review !

What's New with [ ] and Milliken!

| Americas | Asia | Latin America | Europe |

Global Inventory [ ]     Products on Contract

Product Leadtimes

| About Earth Square and First Appearances | How to maintain your carpet |
| Contact Milliken Now! | How to order Milliken carpet off the [ ] contract |

Back to Top     How to use this site

FIG. —3—

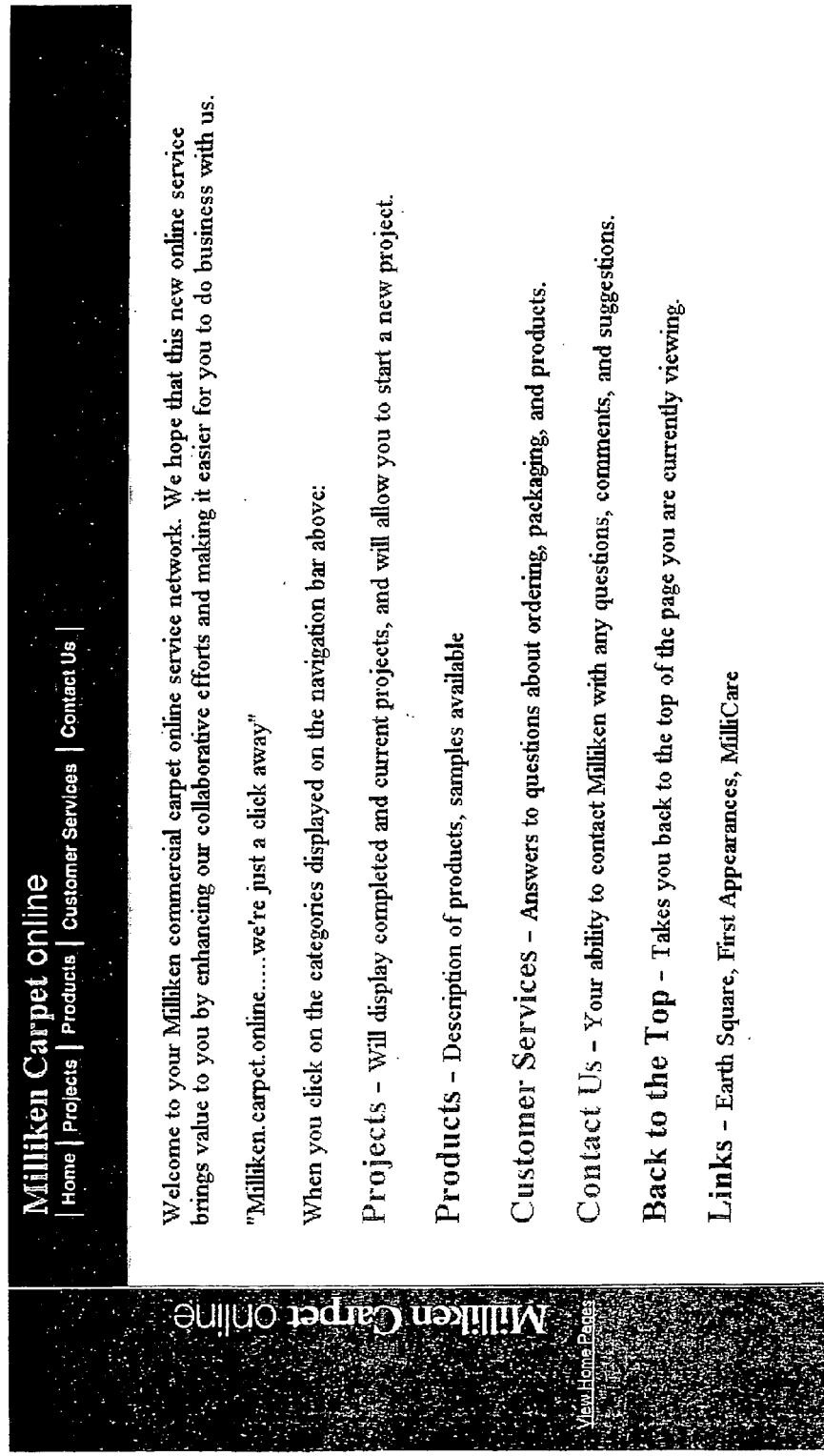
FIG. —4—

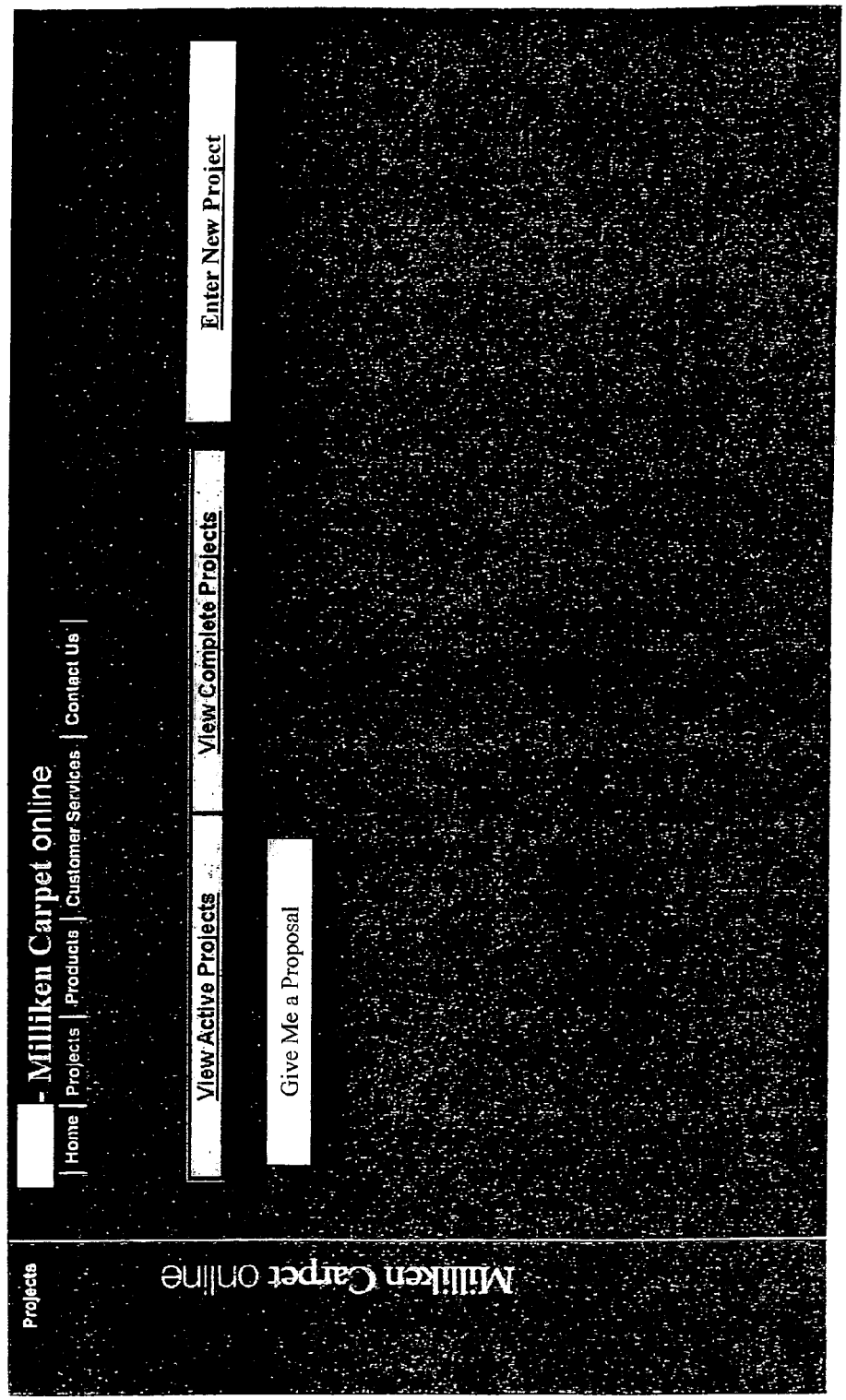
FIG. -5-

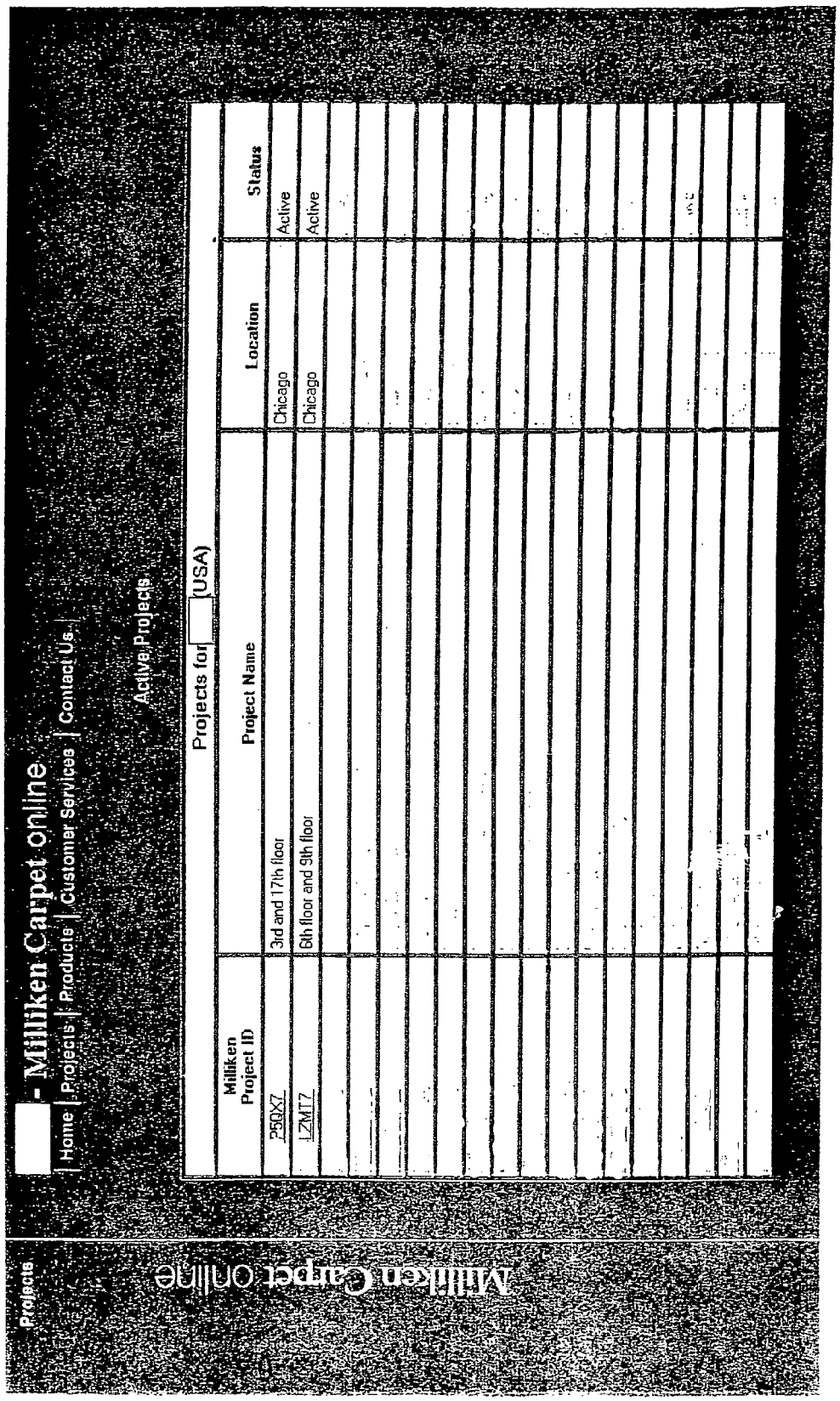
FIG. -6-

FIG. -7-

(*Will Automatically Fill in From Registration Form)

New Project

Your Name * _____    Your Title* _____
Company Name * _____    E-Mail* _____
Your Address * _____    Fax * _____
                                          Phone* _____

Milliken Project # _____    (Milliken Supplied)
Project Name _____    (Based on registration link to Sales Person)
Project Location/Address _____

Your Project Manager: Name: _____    Phone _____

Project Type: Check                    Project Details:
☐ New Construction  ☐ Main Office        Square Footage _____
☐ Renovation        ☐ Branch Office      Construction Start Date _____
                    ☐ Service Center     Carpet Needed by Date _____
                    ☐ Other

*FIG. —8A—*

Project Details Continued

Construction Manager: Company _____ Name _____ Phone _____

General Contractor: Company _____ Name _____ Phone _____

A&D Firm: Company _____ Name _____ Phone _____

Preferred Purchase Method: Check One

☐ Direct From Milliken

☐ Through Certified Dealer

Carpet Type: _____
Pattern _____
Color _____

*FIG. —8B—*

Give me a Proposal

Preferred Installation:    Direct from Milliken _____
(Floor Ready for Carpet)    Certified Local Installer _____

Other Installation Services Required:
    Occupied Office Replacement _____
    Post Installation Cleaning (Carpet) _____
    Other _____

Bill to: Name _____
        Address _____
_____

Your PO#/Reference#: _____

Ship to: (Specific Location)
        Name _____
        Address _____
_____

Products (each):
    Pattern _____
    Color _____
    Quantity (Sq. Ft.) _____

We will respond to your request in 2-3 working days, via e-mail. If your response requirements are needed faster please check here: ☐
(E-mail to Account Leader, Sales Person and Log)

FIG. −9A−

Project Details Continued

Construction Manager: Company _____ Name _____ Phone _____
General Contractor: Company _____ Name _____ Phone _____
A&D Firm: Company _____ Name _____ Phone _____

Preferred Purchase Method: Check One
☐ Direct From Milliken
☐ Through Certified Dealer Carpet Type:
 Pattern _____
 Color _____

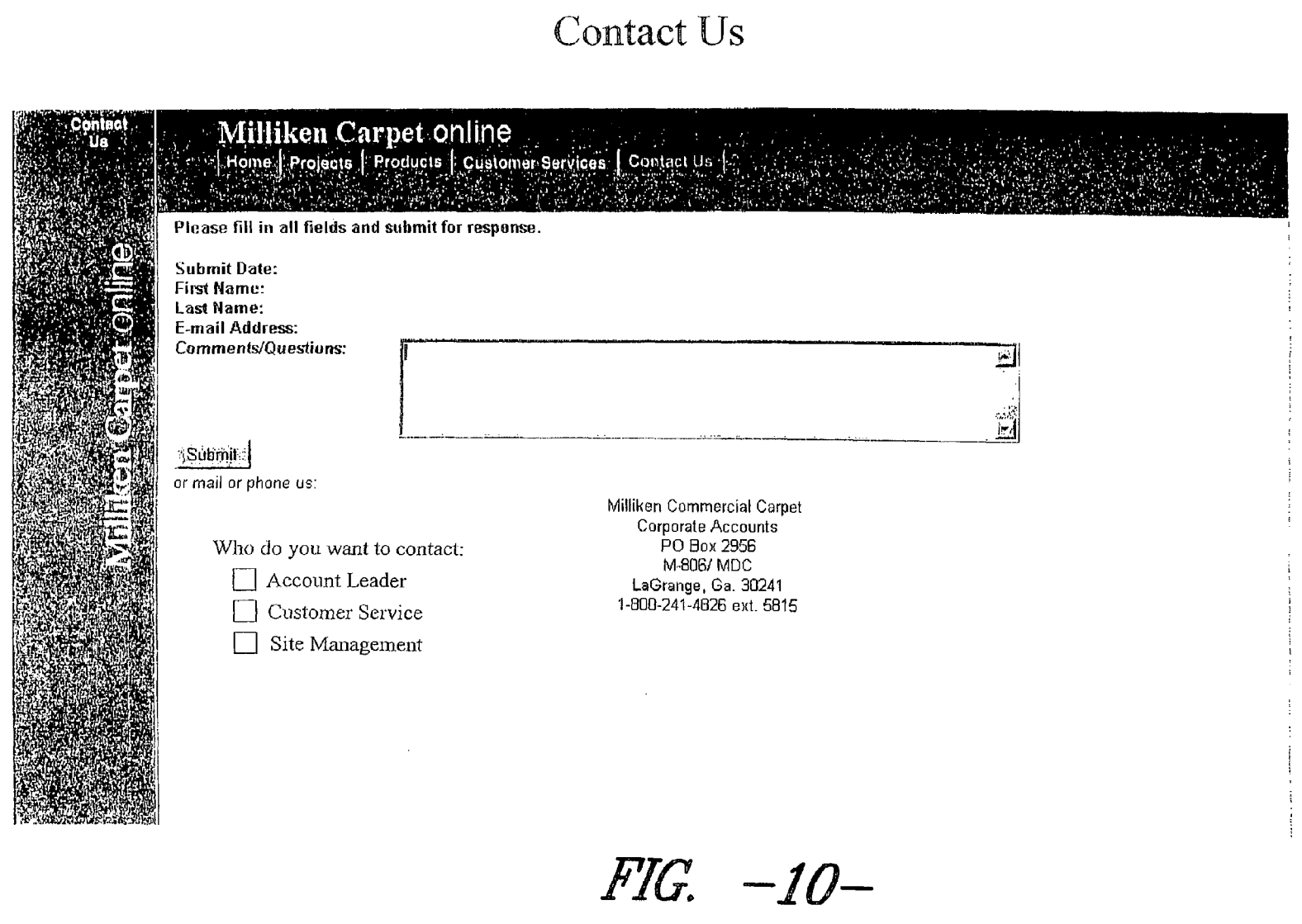

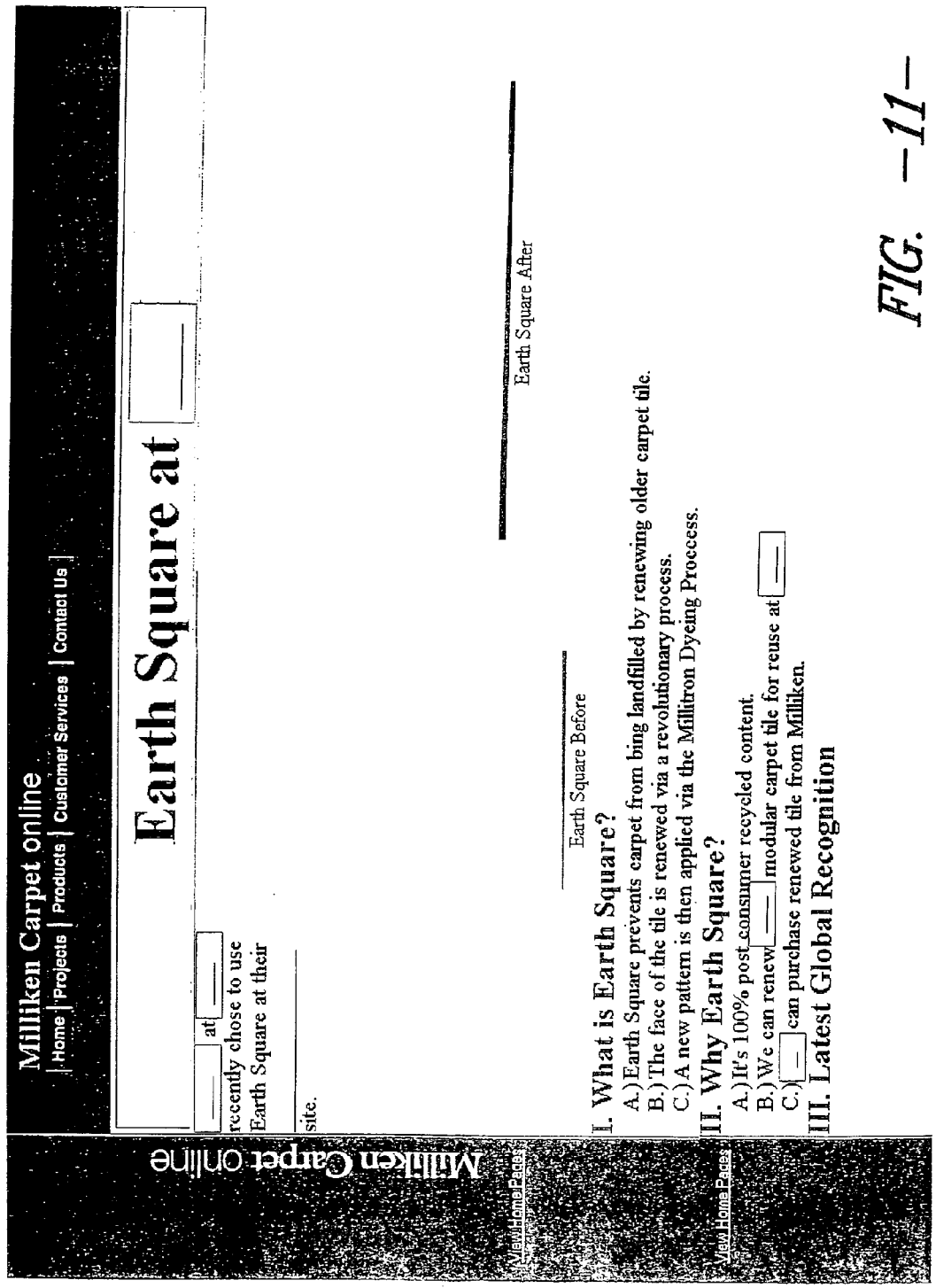
FIG. —11—

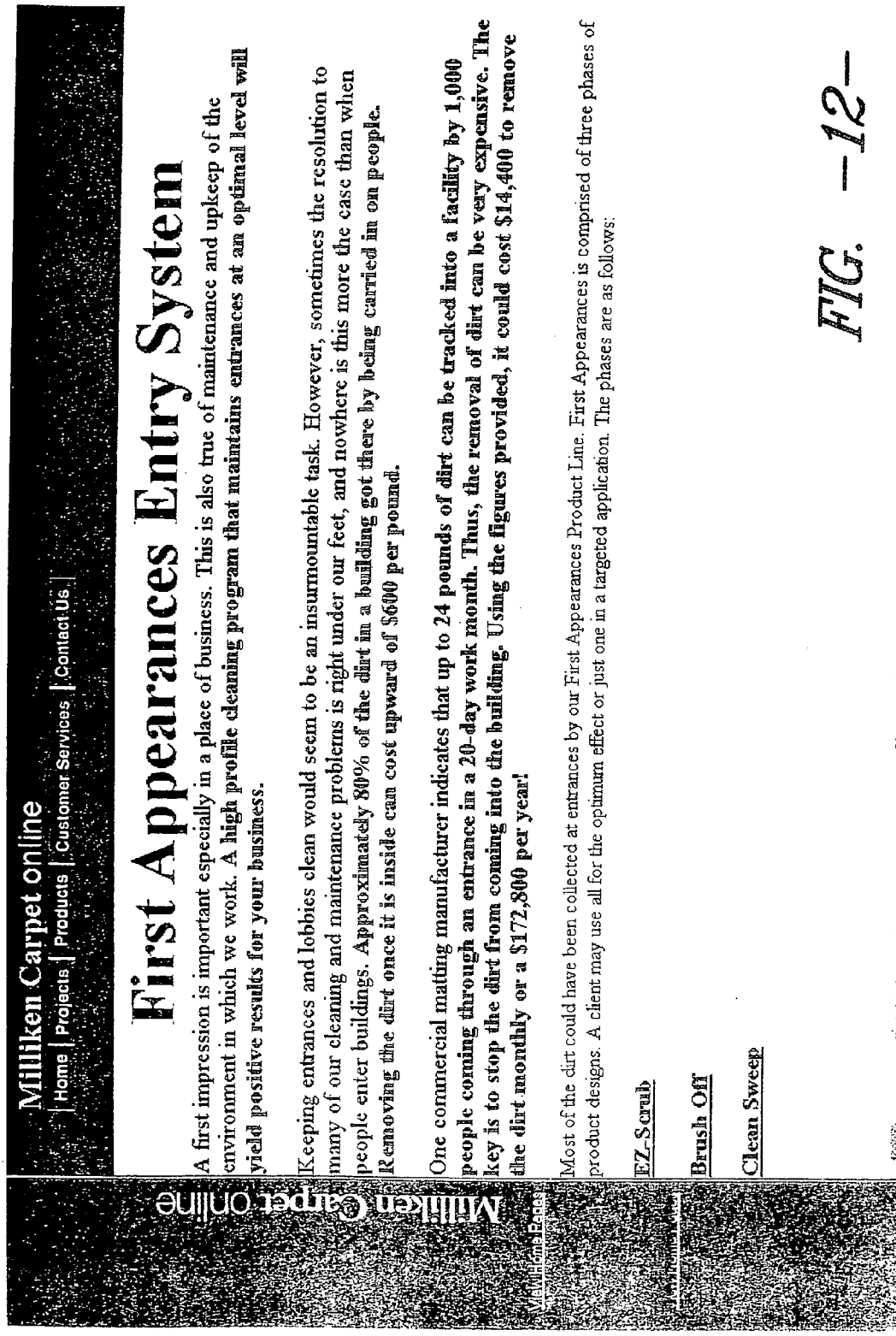
FIG. -12-

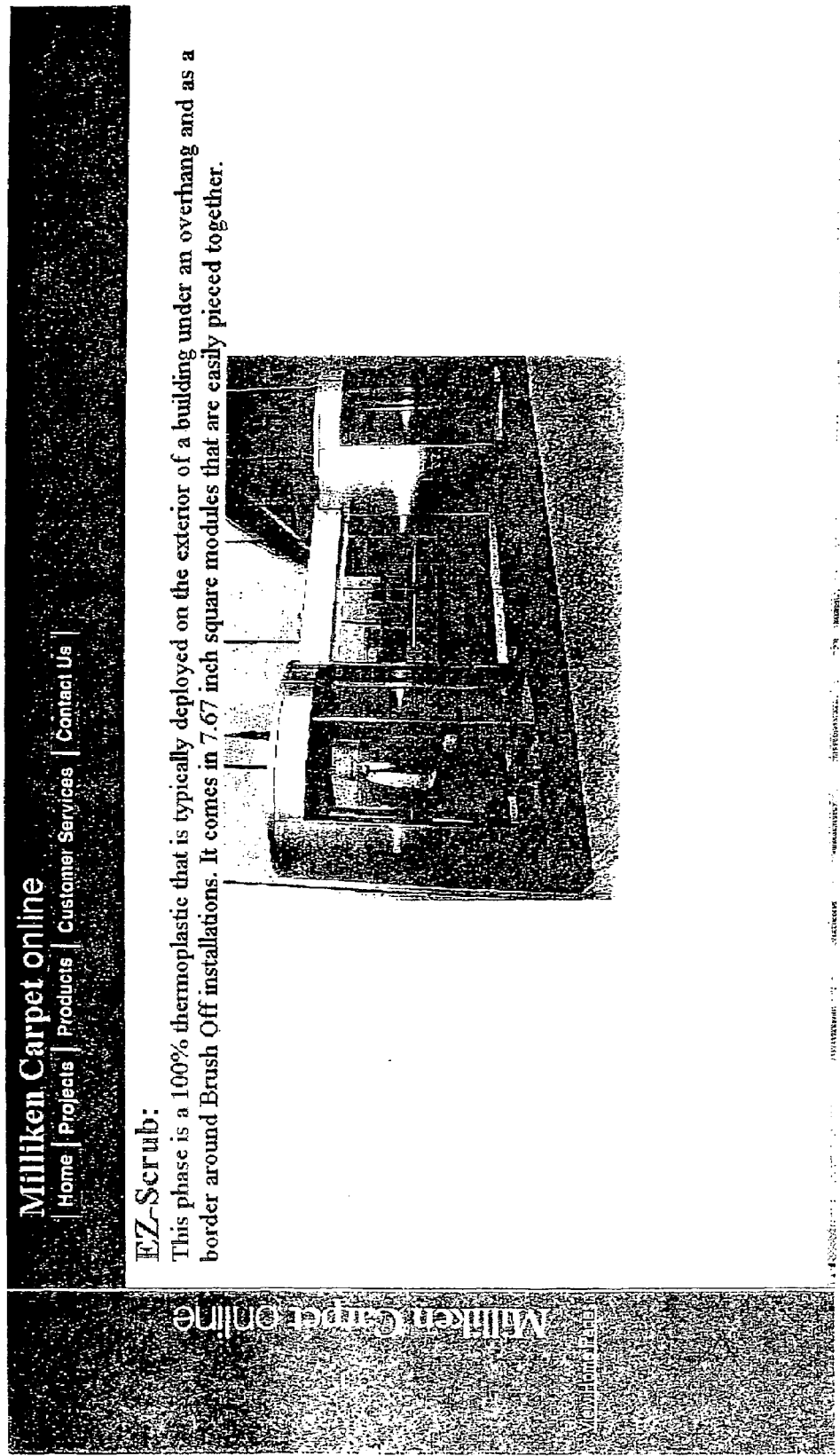
FIG. -13-

FIG. -14-

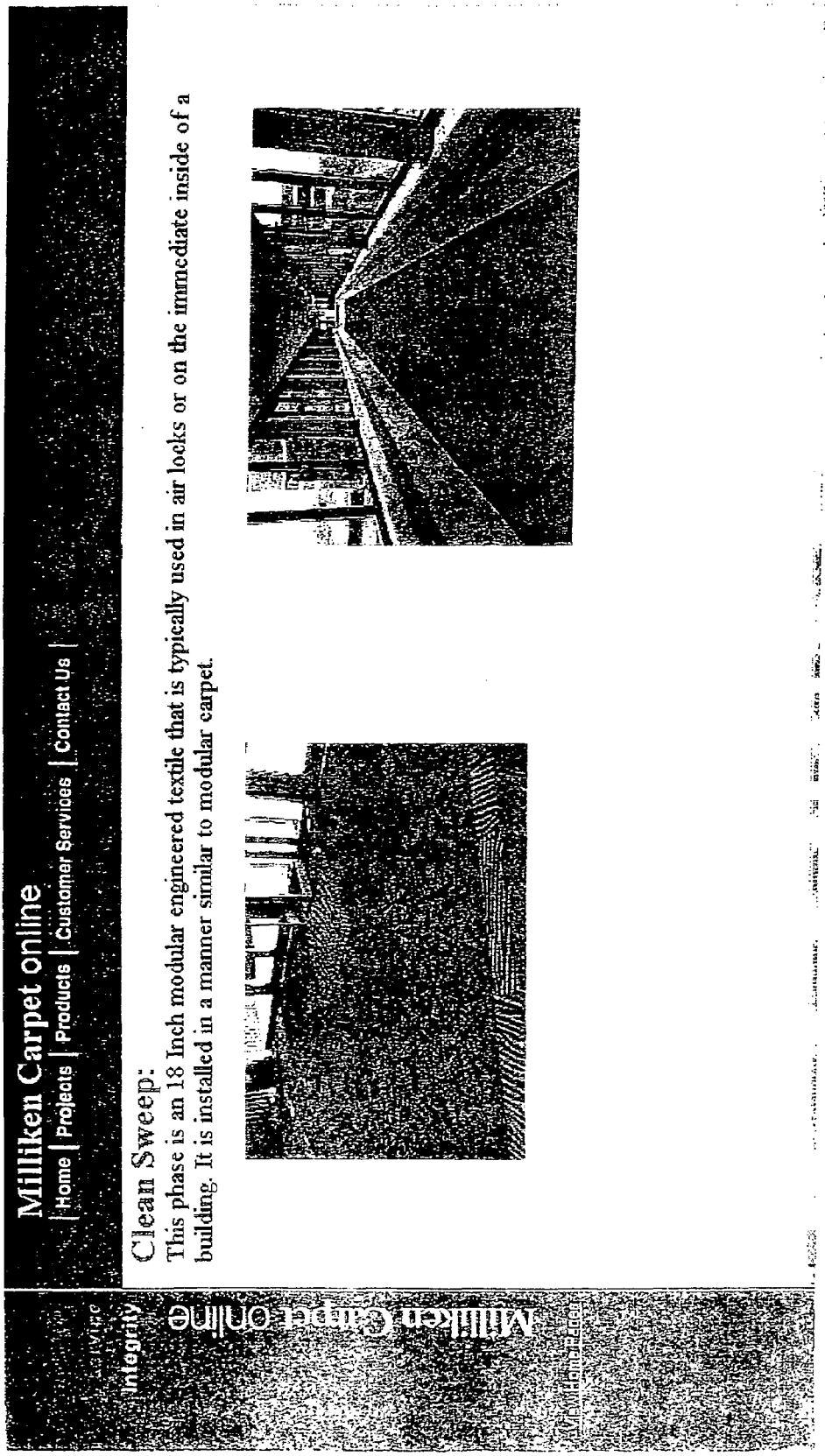
FIG. -15-

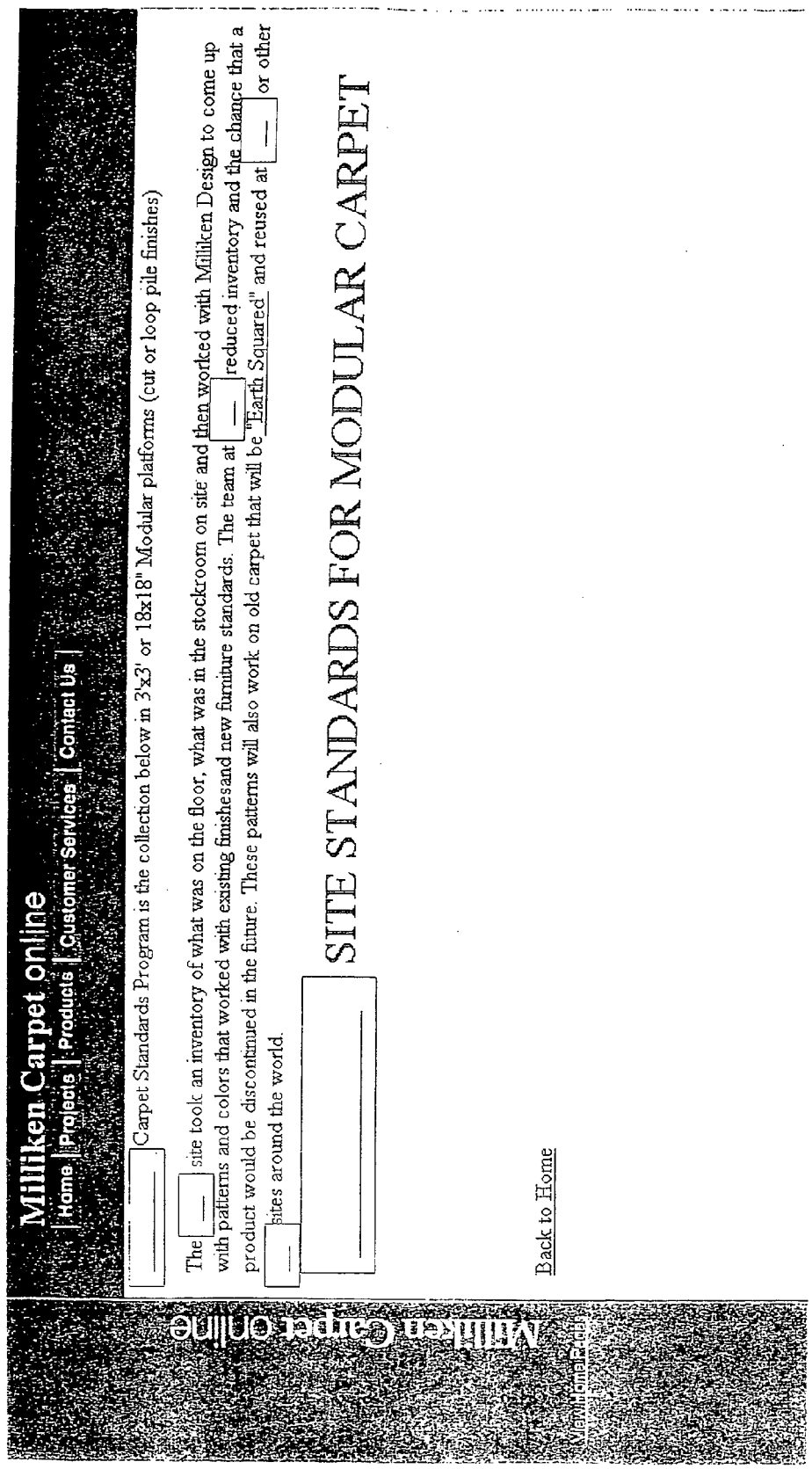
FIG. −16−

FIG. -17-

Milliken Carpet online
| Home | Projects | Products | Customer Services | Contact Us |

▼2. Specifications
Attitudes P/6601

Milliken Carpet online
| Home | Projects | Products | Customer Services | Contact Us |

Milliken Carpet        Date: 06/29/2000
                       Supersedes: 01/06/2000

*Attitudes P/6601*

SPECIFICATIONS (36" x 36" Modular with Comfort Plus®):

| | |
|---|---|
| Construction | Tufted, Textured Loop Pile |
| Face Fiber | 100% Milliken Certified WearOn® Nylon |
| Soil Protectant | MilliGuard® |
| Antimicrobial | BioCare® |
| Dye Method | Spacedye®/Millitron® |
| Finished Face Weight | 20 oz./sq.yd. (678.1 g/sq.m) |
| Gauge | 1/8 in. (31.5/10 cm) |
| Rows | 8.0/in. (31.5/10 cm) |
| Tufts | 66.2/sq.in (1004.9/100 sq.cm) |
| Finished Pile Height | 0.152 in. (3.86 mm) avg. |

*FIG. —18—*

FIG. —19—

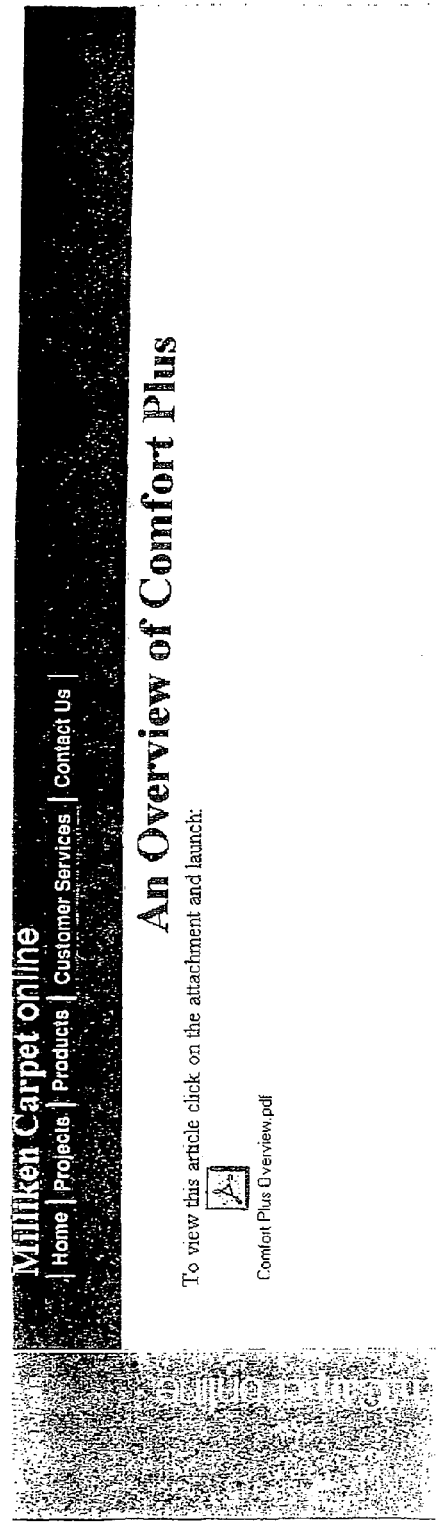
FIG. -20-

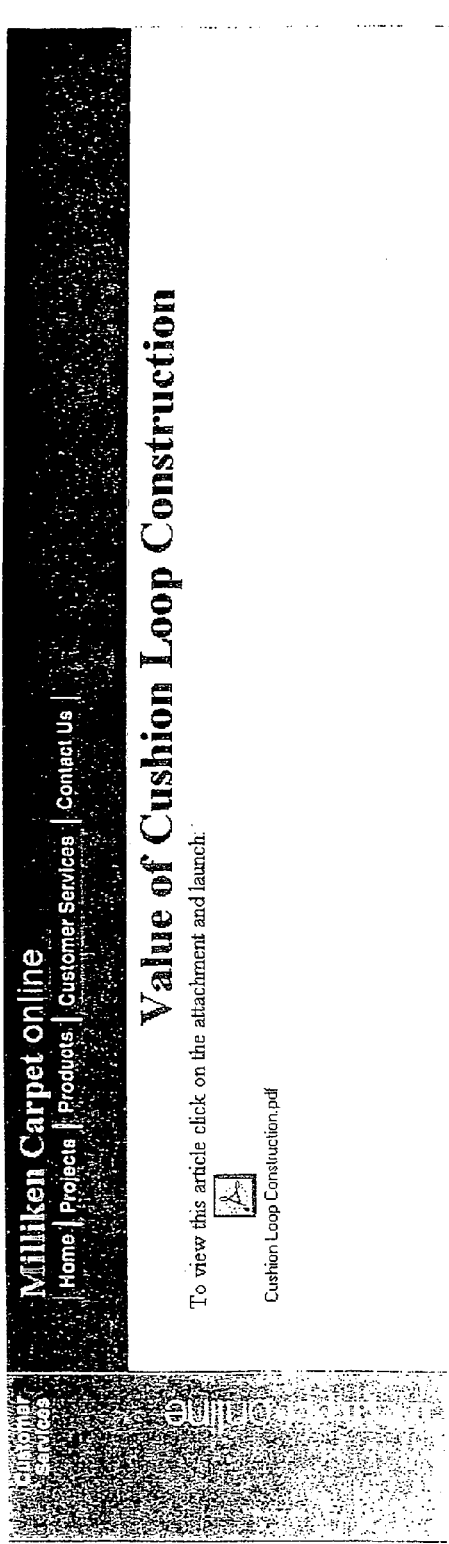
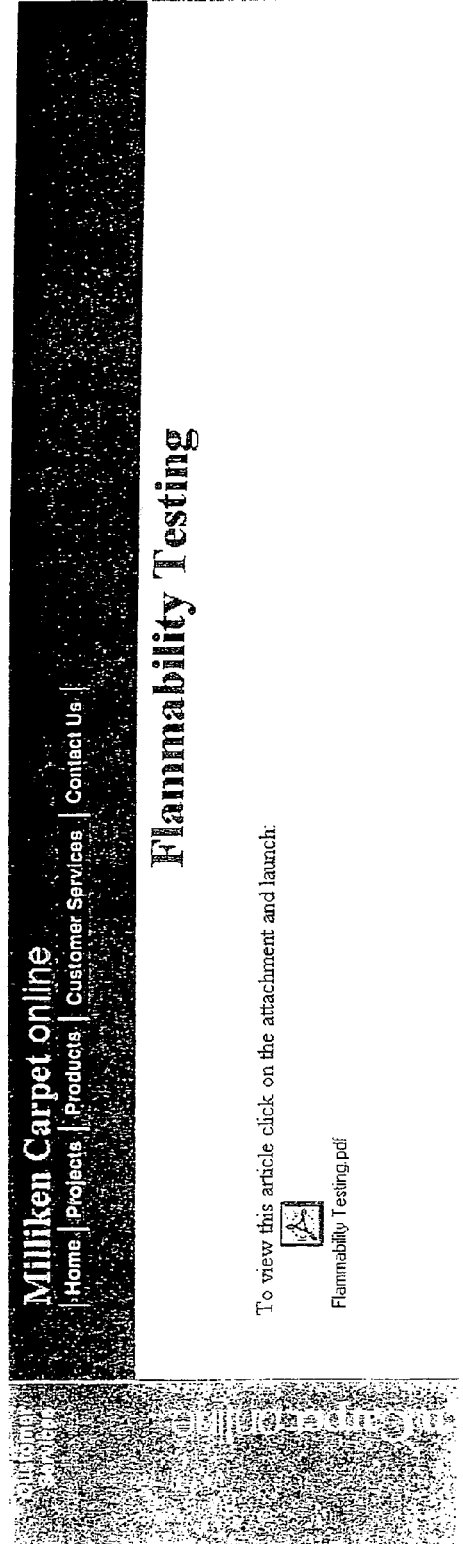
FIG. -21-

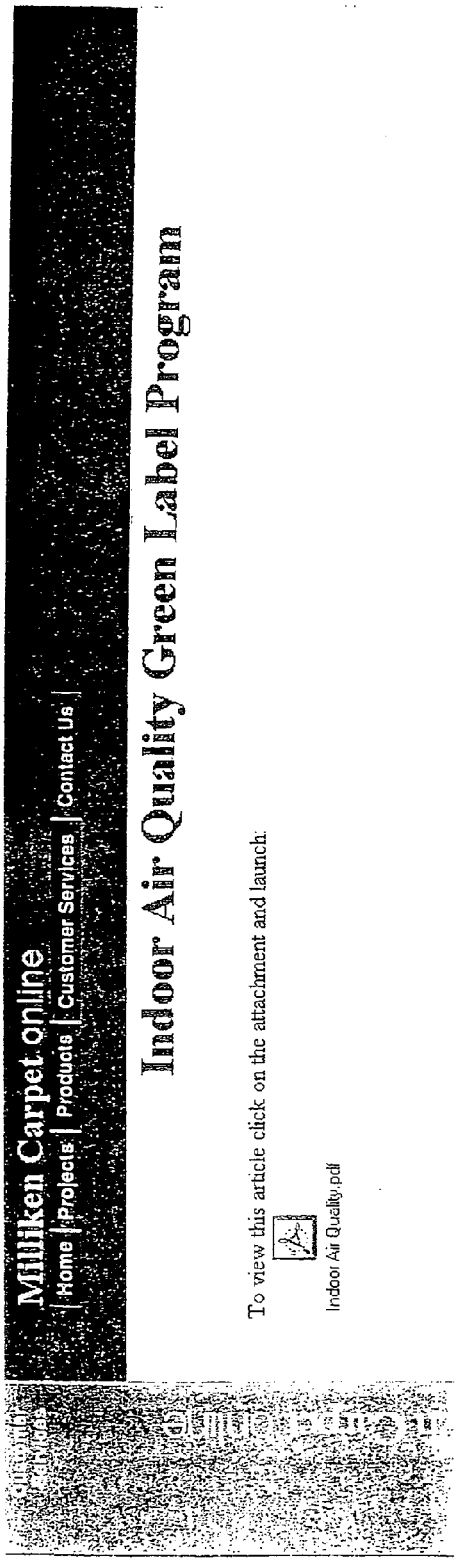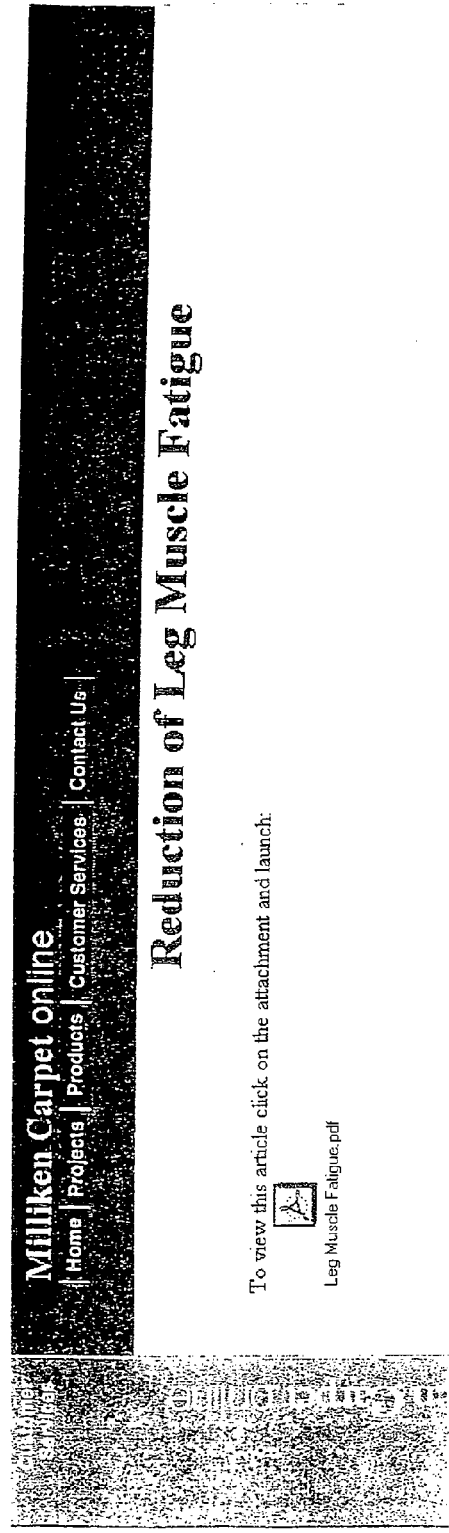
FIG. -22-

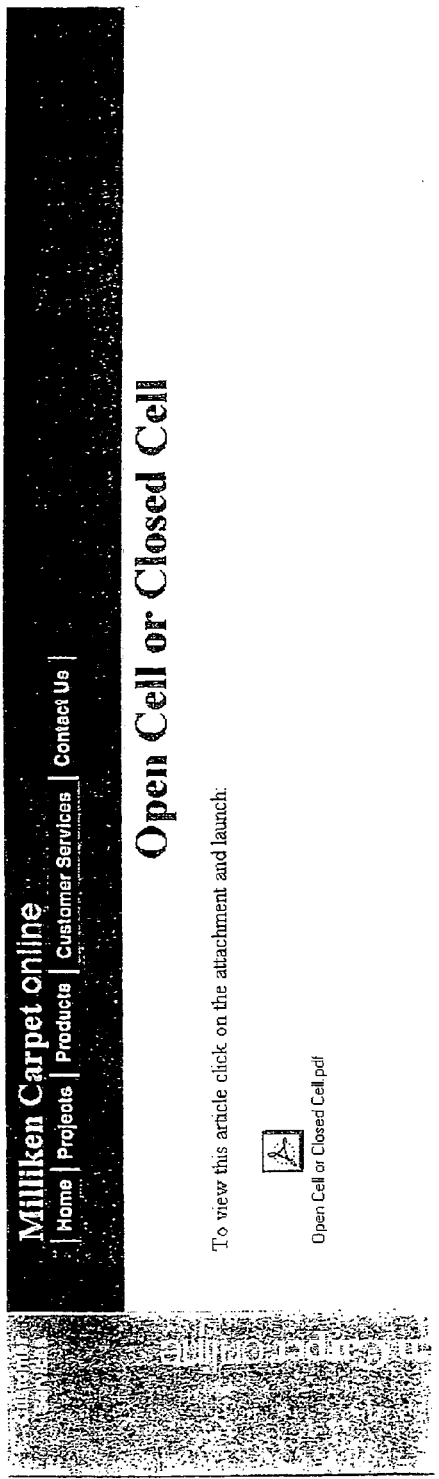
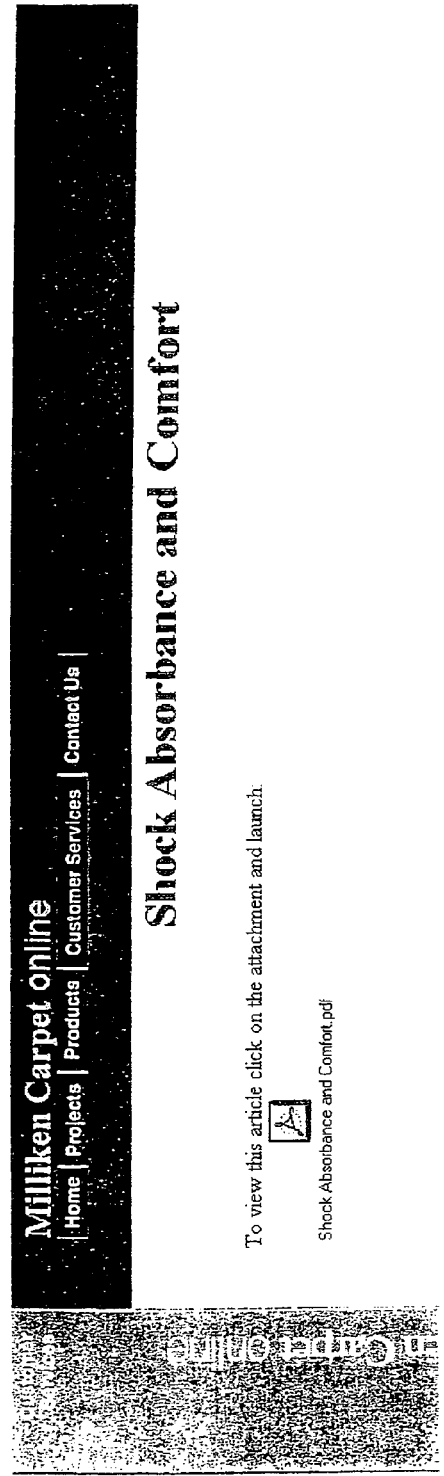
FIG. -23-

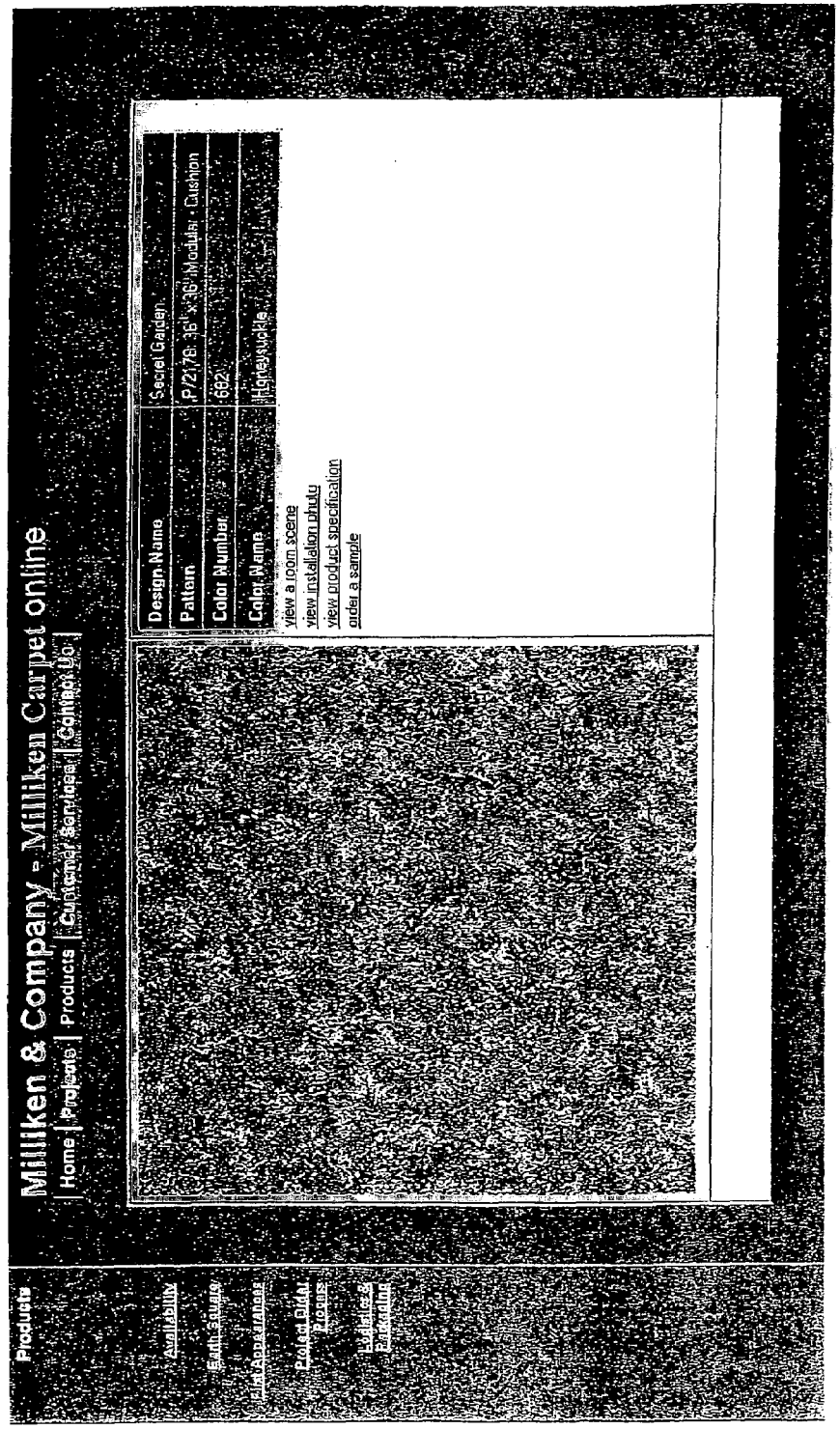
FIG. -24-

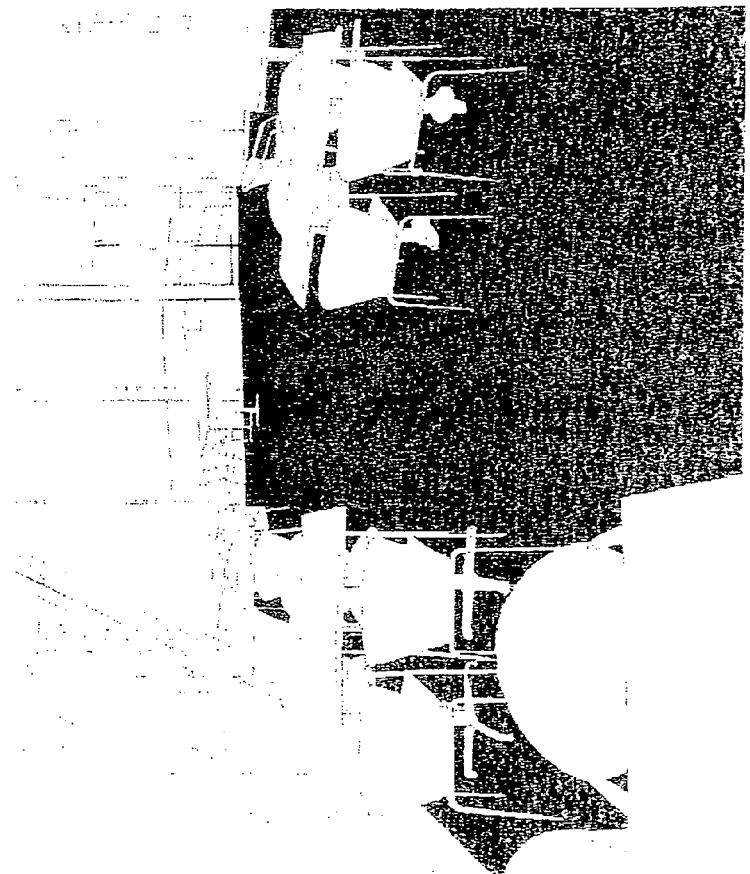
FIG. -25-

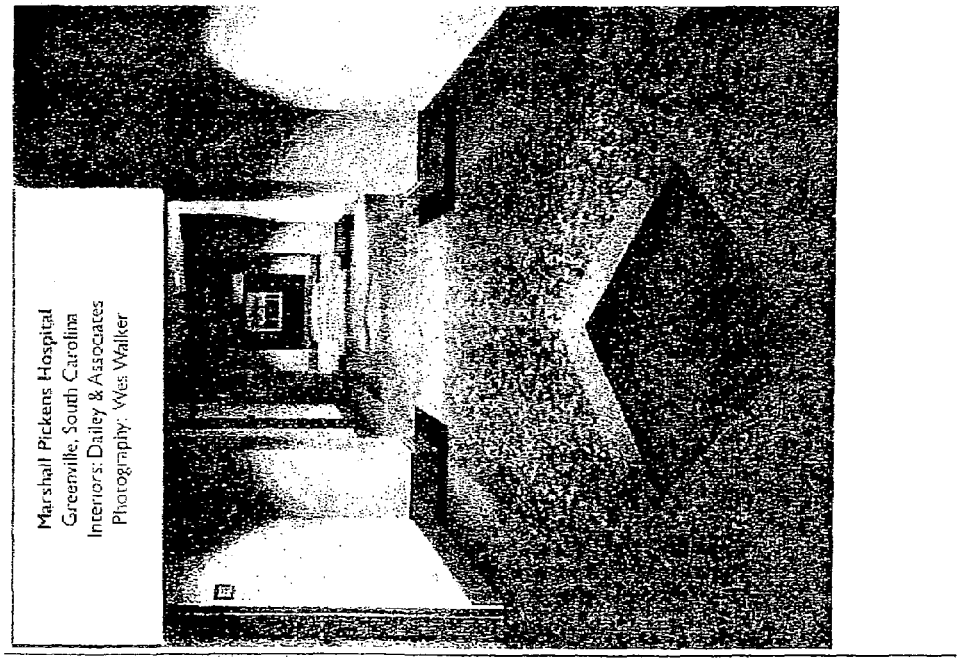
FIG. -26-

View Product Specification

Milliken & Company – Milliken Carpet online
| Home | Projects | Products | Customer Services | Contact Us |

Milliken Carpet        Date:    09/07/2000
                             Supersedes: 06/29/2000

*Movements*

SPECIFICATIONS (36" x 36" Modular with Comfort Plus®):
P/2178 Movements

| | |
|---|---|
| Construction | Bonded, Cut Pile |
| Face Fiber | 100% Milliken Certified WearOn® Nylon |
| | Twisted and Heat Set for Maximum Performance |
| Soil Protectant | MilliGuard® |
| Antimicrobial | BioCare® |
| Dye Method | StockDye/Spacedye®/Millitron® |
| Finished Face Weight | 28 oz./sq.yd. (949.4 g/sq.m) |
| Gauge | 1/7.95 in. (31.3/10 cm) |
| Rows | 6.9 in. (27.2/10 cm) |
| Tufts | 54.9/sq.in. (851.4/100 sq.cm) |
| Finished Pile Height | 0.161 in. (4.09 mm) |
| Average Density | 6,261 |
| Density Factor | 455,554 |
| Standard Backing | PVC-Free Comfort Plus® cushion |
| Nominal Total Thickness | 0.42 in. (10.67 mm) |
| Flammability (Radiant Panel ASTM-E-648) | >=0.45 (Class I) |
| Smoke Density (NFPA-258-T or ASTM-E-662) | <=450 |
| Methenamine Pill Test | Self-Extinguishing |
| (CPSC FF-1-70 or ASTM D 2859) | |
| Lightfastness (AATCC 16E) | >=4.0 at 80 hrs |

FIG. —27—

FIG. -28-

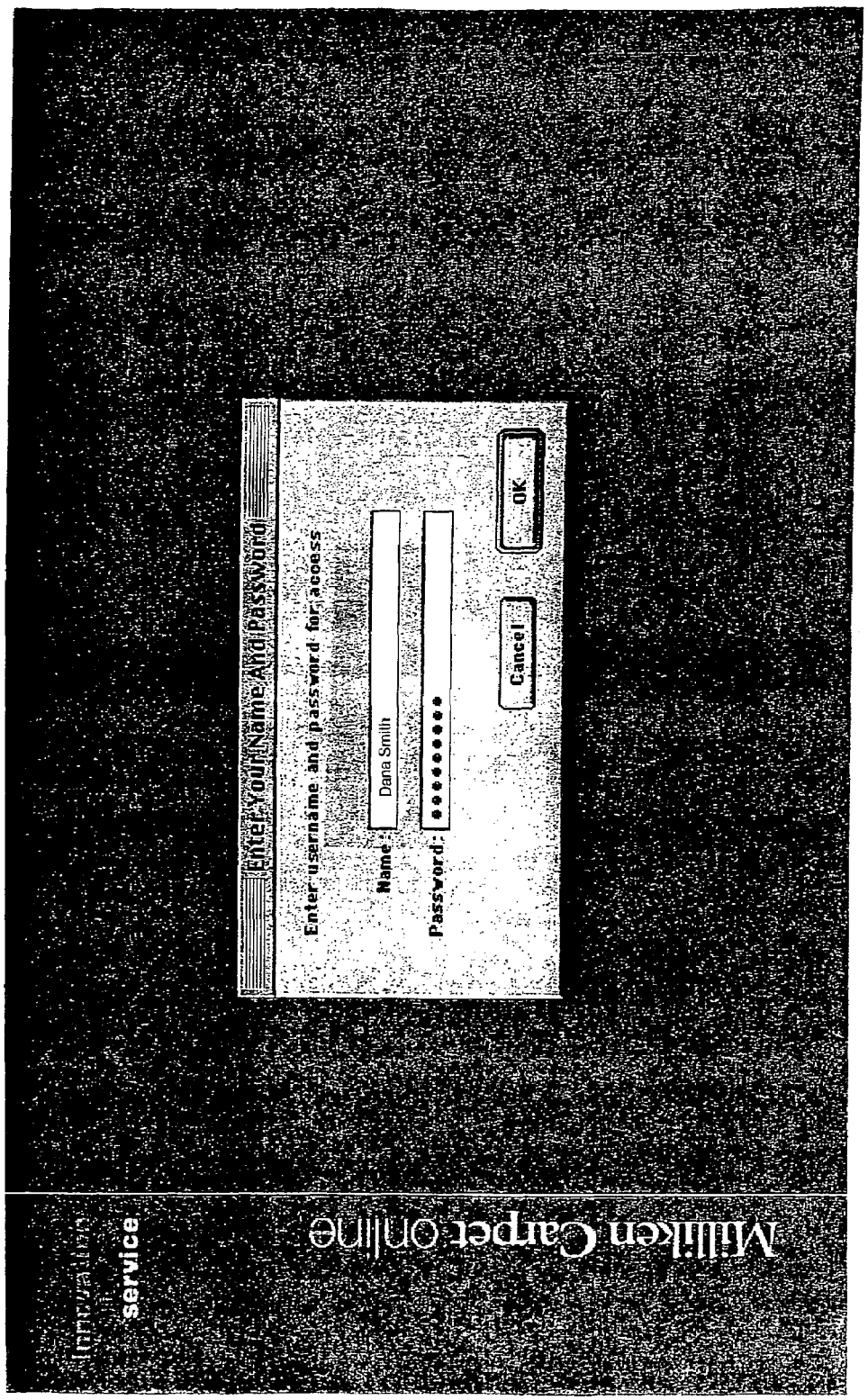
FIG. -29-

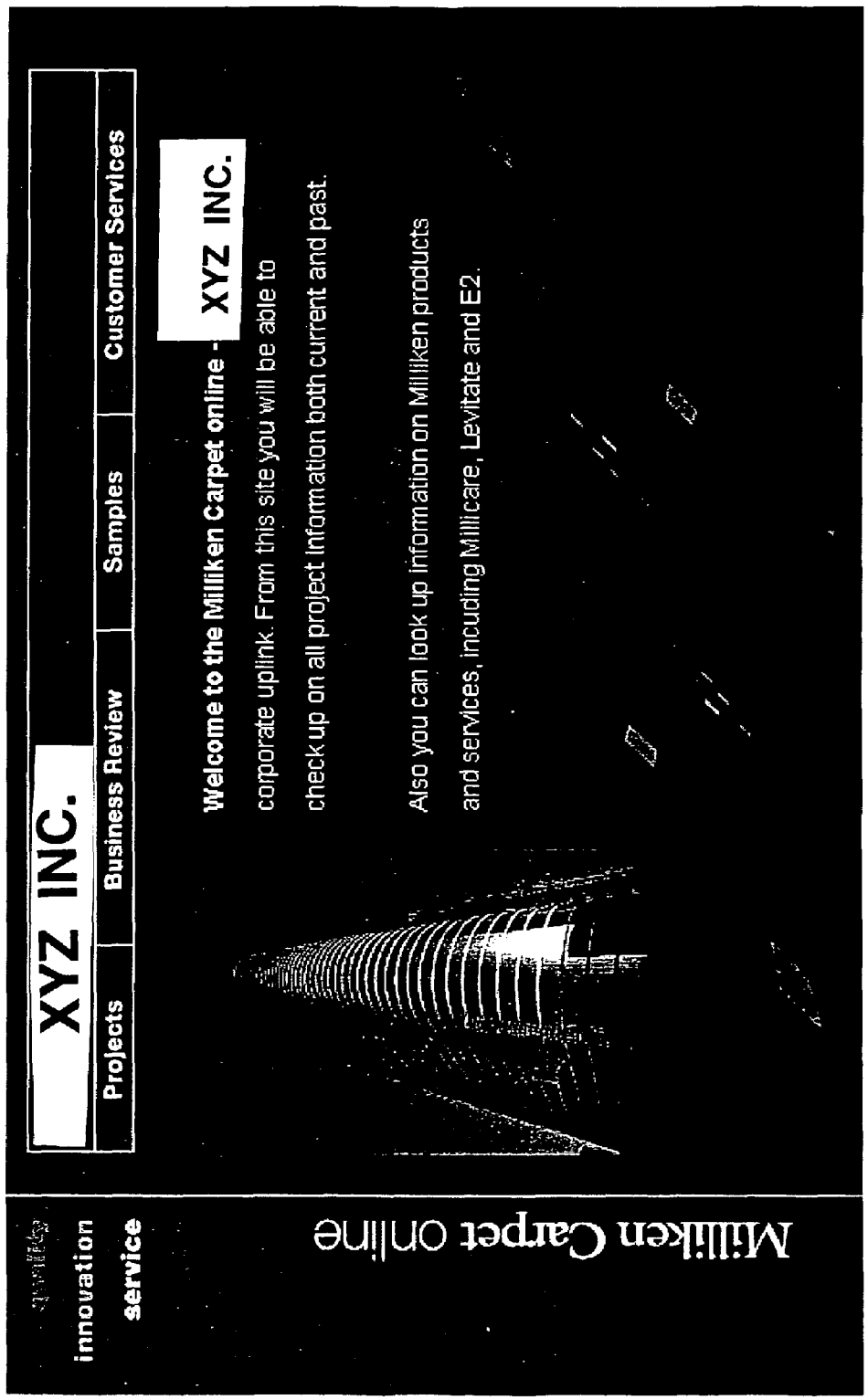
FIG. −30−

XYZ INC.

| Projects | Business Review | Samples | Customer Services |

| Project ID | Project Name | Project Leader | Date |
|---|---|---|---|
| 000001 | Concept Office | Bob | 1-1-00 |
| 000002 | US Head Quarters | Sally | 2-2-00 |
| 000003 | Phoenix Branch | Tim | 3-3-00 |
| 000004 | Dallas Branch | Jim | 4-4-00 |
| 000005 | Trade Show | Bob | 5-5-00 |
| 000006 | New York Branch - A | Sally | 6-6-01 |
| 000007 | New York Branch - B | Tim | 3-3-01 |
| 000008 | Chicago Branch | Jim | 2-2-01 |

Milliken Carpet online

Projects

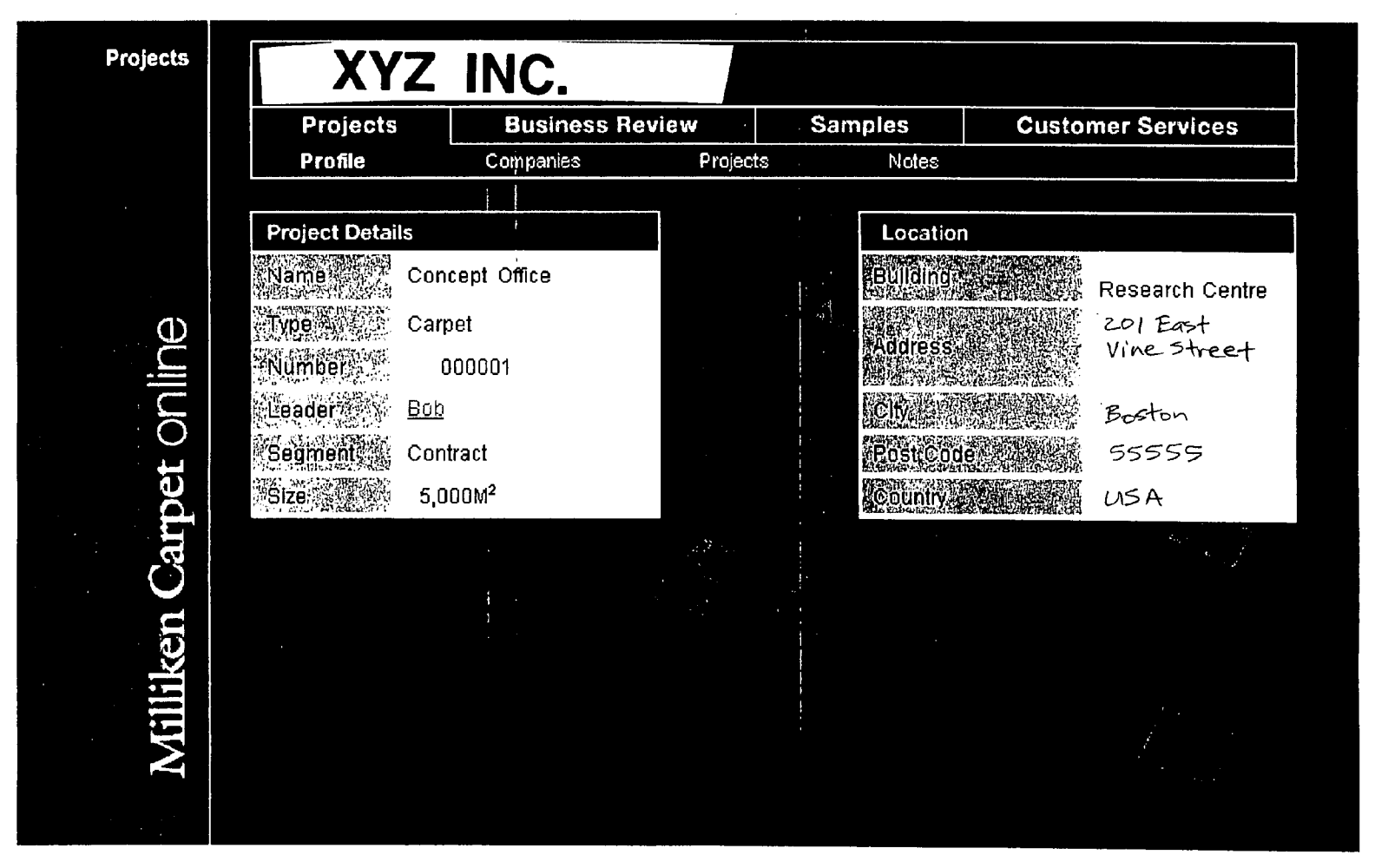

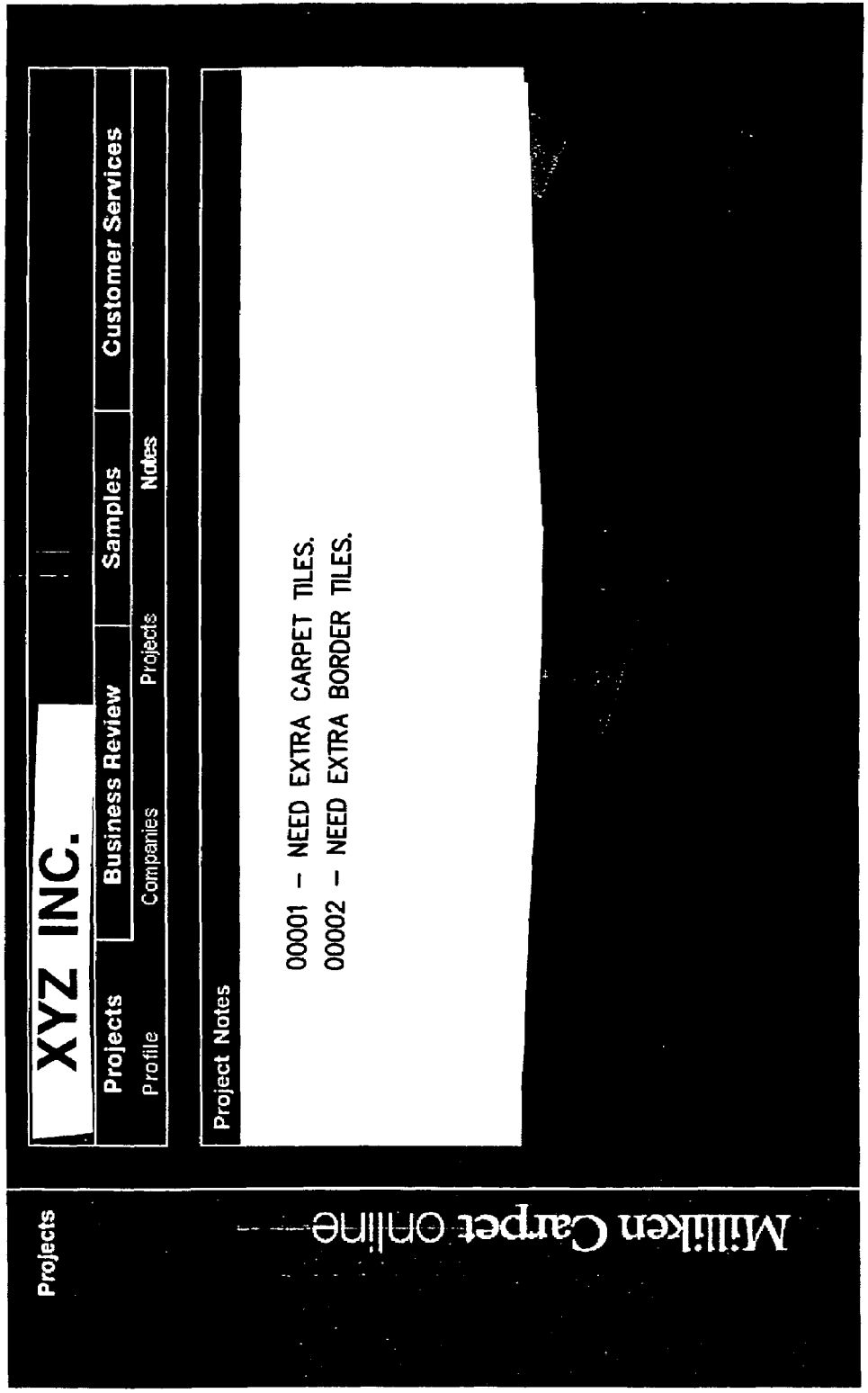
FIG. -33-

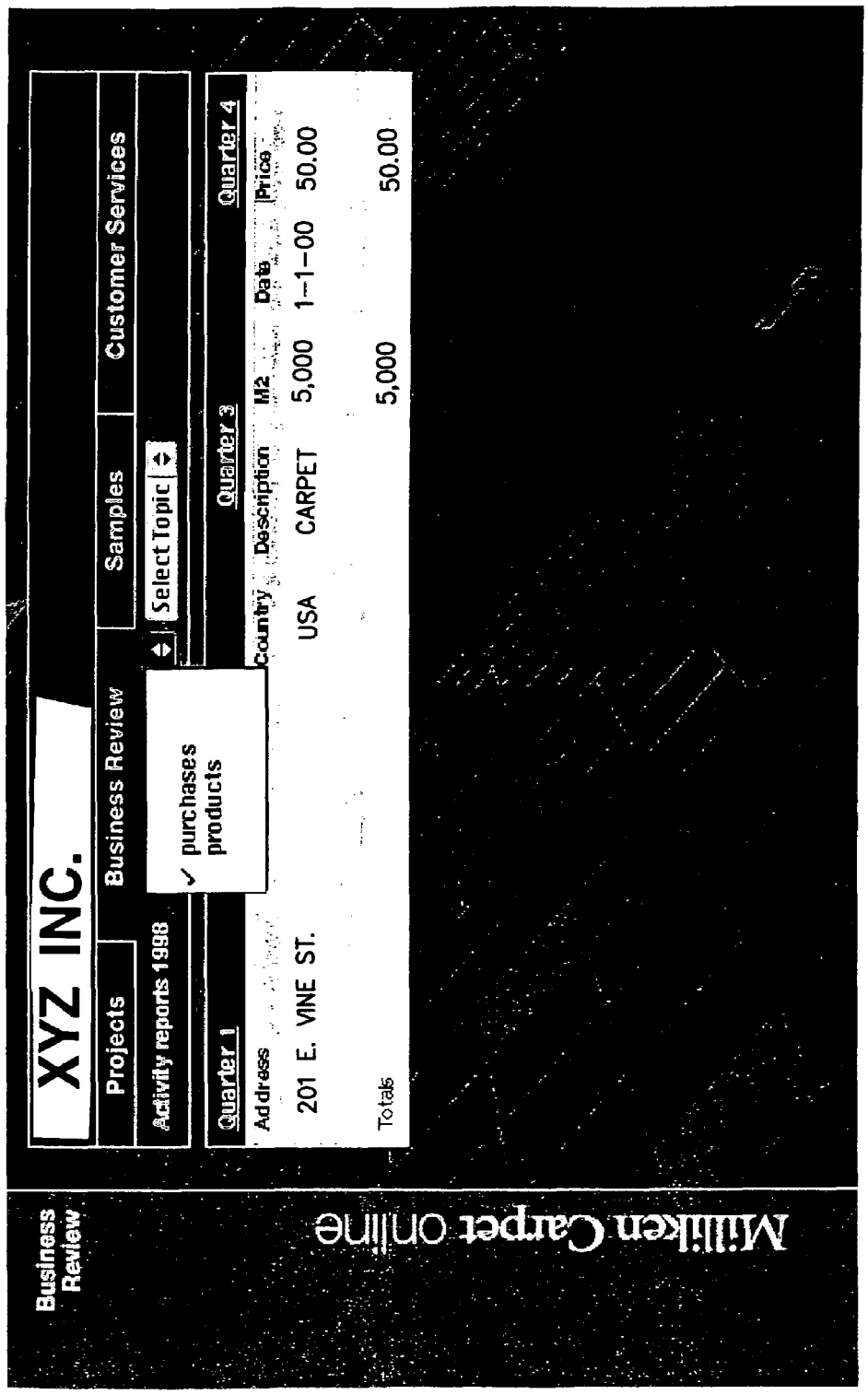
FIG. -34-

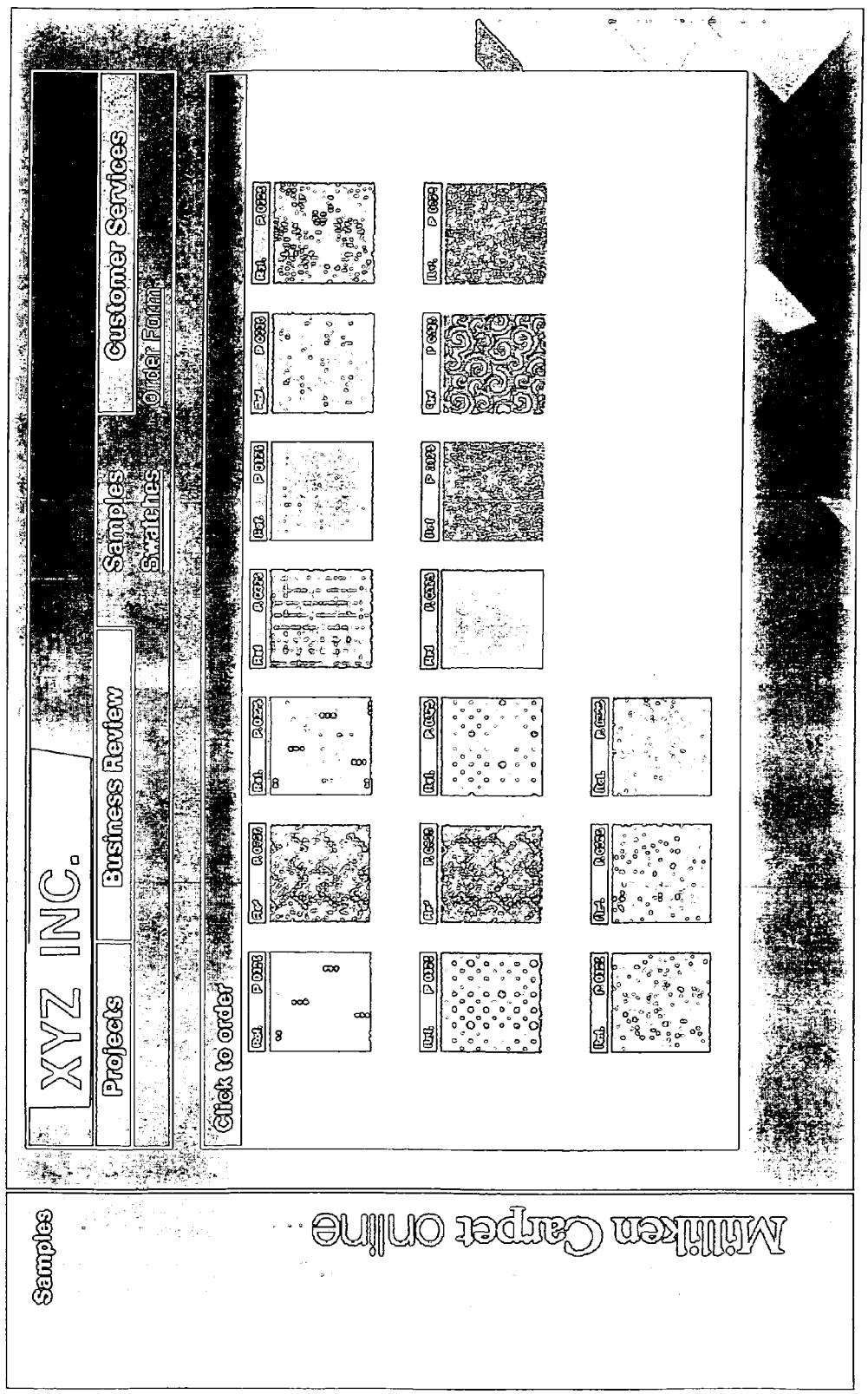
FIG. -35-

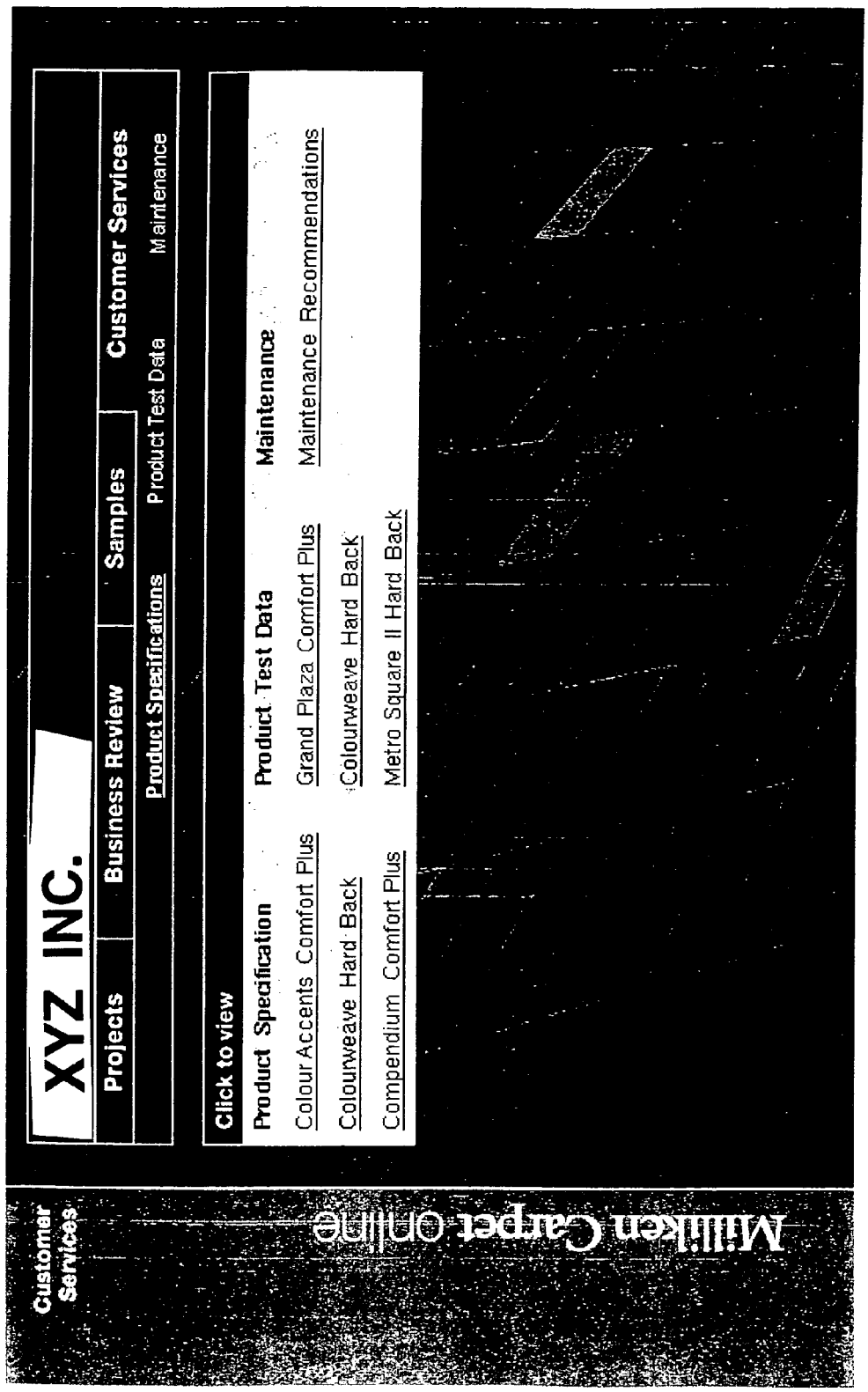
FIG. -36-

METHOD OF PROVIDING PROJECT AND PRODUCT INFORMATION TO A PURCHASER OF FLOOR COVERING MATERIALS

TECHNICAL FIELD

This invention relates to electronic commerce. More specifically, this invention relates to a system for retrieval of information relating to floor covering products and installations and/or the ordering of floor covering products by a current or prospective customer. The scope of data available to a requesting party is limited to preestablished elements within a catalog of data for a particular customer such that different requesters have access to different types and/or scopes of information.

BACKGROUND OF THE INVENTION

Floor coverings such as carpet, carpet tile, and the like are features of substantial importance in a building environment. The purchase of floor covering materials typically represents a fairly substantial investment and may involve a degree of complexity due to the need to coordinate delivery and installation with other activities at the building location. Due to the level of investment involved and the importance of the floor covering to the overall appearance of the facility, the purchase of floor coverings by many large organizations is conducted as part of a centralized coordinated effort. Such centralized purchasing permits the customer to monitor costs and to establish a relatively uniform appearance for different locations in terms of quality and general style. At the same time, within this broad framework of general uniformity, such organizations may oftentimes provide regional or local management with a degree of discretion regarding the final choice of floor covering styles from a preapproved list of alternatives. Once the floor covering is selected, a local or regional representative of the customer generally has responsibility for monitoring the progress of the delivery and installation of the floor covering for locations in that region. At the same time, one or more individuals with more broad-based corporate responsibility will have ultimate responsibility for broader groups of facilities. Thus, one person may have responsibility for installations on a global basis while the details of installations in individual countries and/or regions of countries may be coordinated by other individuals.

Heretofore, the monitoring of floor covering installation projects by a customer has required direct contact between a representative of the customer and a representative of the floor covering manufacturer, distributor, dealer, or the like. Requests for updates and status reports were passed from the representative of the customer to the representative of the floor covering manufacturer who would then obtain the information from the manufacturer and communicate back to the representative of the customer the requested information. Likewise, in the event that a new installation of floor coverings was contemplated, a request for quotation "RFQ" had to be communicated through the representative of the floor covering manufacturer who would then pass the request on to the manufacturer for evaluation. While generally effective, these mechanisms have necessarily led to time delays and potential frustration due to the multiple layers of human interaction required to process and/or respond to requests for information.

SUMMARY OF THE INVENTION

The present invention provides advantages and alternatives over the prior art by providing a software and/or internet based system and method for enabling a buyer or potential buyer of floor coverings to access directly information relating to former, current and proposed future installation projects as well as information on available products.

In an exemplary embodiment, the information available is tailored to the needs of the individual requester. Global data for a customer is broadly accessible through a Uniform Resource Locator (URL) site dedicated to that customer. However, the actual scope of information available to any individual requesting data on behalf of a customer is limited to pre-authorized data elements corresponding to the scope of responsibility held by the requesting individual. Thus, a purchasing manager for a customer may have access to the totality of all data relating to floor covering products and installation projects for that customer, while a regional purchasing supervisor may have access only to data relating to products and installations within his or her region of responsibility. Likewise, local or regional managers who are selecting the floor covering material may have access to data on only a finite number of products which have been preselected by the customer's purchasing department as being suitable for installation within that region. By tailoring the information to which any individual requester has access, it is believed that relevant data and information can be accessed more easily without the occurrence of unnecessary confusion. At the same time a proper degree of control is maintained over the selection of the floor covering material as well as over the details of delivery and installation with such control being maintained at appropriate levels within the organizational structure of the purchasing entity.

In accordance with one aspect of the invention, the data available to an individual requester is predefined by agreement between the customer or customer representative or agent and the floor covering manufacturer or provider. The identities of appropriate requesting individuals are also defined by agreement between the customer and the floor covering manufacturer. Each approved requester is provided with a registration number and ID for purposes of logging on to the system. Based upon the registration number and ID utilized to log on to the system, information of the previously agreed upon scope associated with that registration number and ID is made available to the user. Correspondingly, information outside of the preagreed upon scope is filtered out and is unavailable to the requester.

In a potentially preferred embodiment, the various components may be accessed through a centralized Internet or World Wide Web web site of the floor covering manufacturer or provider. Through such a centralized web site, the requester can, upon entry of an appropriate registration number and password, gain access to a customer specific request page at a URL dedicated to the corporate or business entity represented by the requester. Through such a customer specific request page, the requester may access project details of preauthorized scope, product details of preauthorized scope, customer service details of preauthorized scope, or submit an order, comment or question to the floor covering manufacturer. The access available to the requester pursuant to his or her request is of only the scope previously agreed upon by the floor covering manufacturer and the customer. Through the customer specific request page, requests for quotations for new projects may also be made for direct response by the floor covering manufacturer. Finally, products may be ordered and invoices generated utilizing the system of the present invention.

One benefit of the invention is that it provides a fully interactive exchange of information while nonetheless affording different persons within the same purchasing entity or organization with different scopes of access depending upon the preestablished access criteria agreed upon by the purchasing entity and the floor covering manufacturer.

BRIEF DESCRIPTION OF THE DRAWINGS

The drawings of this patent document contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

These and other features and advantages of the invention will now be described with reference to the drawings of certain preferred embodiments, practices and procedures which constitute a part of this specification and which are intended to illustrate and not to limit the invention, and in which:

FIG. 1 is a high-level architectural drawing illustrating the primary components of a system according to an exemplary embodiment of the present invention;

FIG. 2 is a flow chart setting forth steps involved in the practice of at least one embodiment of the present invention;

FIG. 3 is a representation of a screen display illustrating an HTML document customer specific request page;

FIG. 4 is a representation of a screen display illustrating an HTML document on How to Use the Site;

FIG. 5 is a representation of a screen display illustrating an HTML document linking page to project listings and new proposal sites;

FIG. 6 is a representation of a screen display illustrating an HTML document corresponding to active projects for a specific customer;

Figure 7:
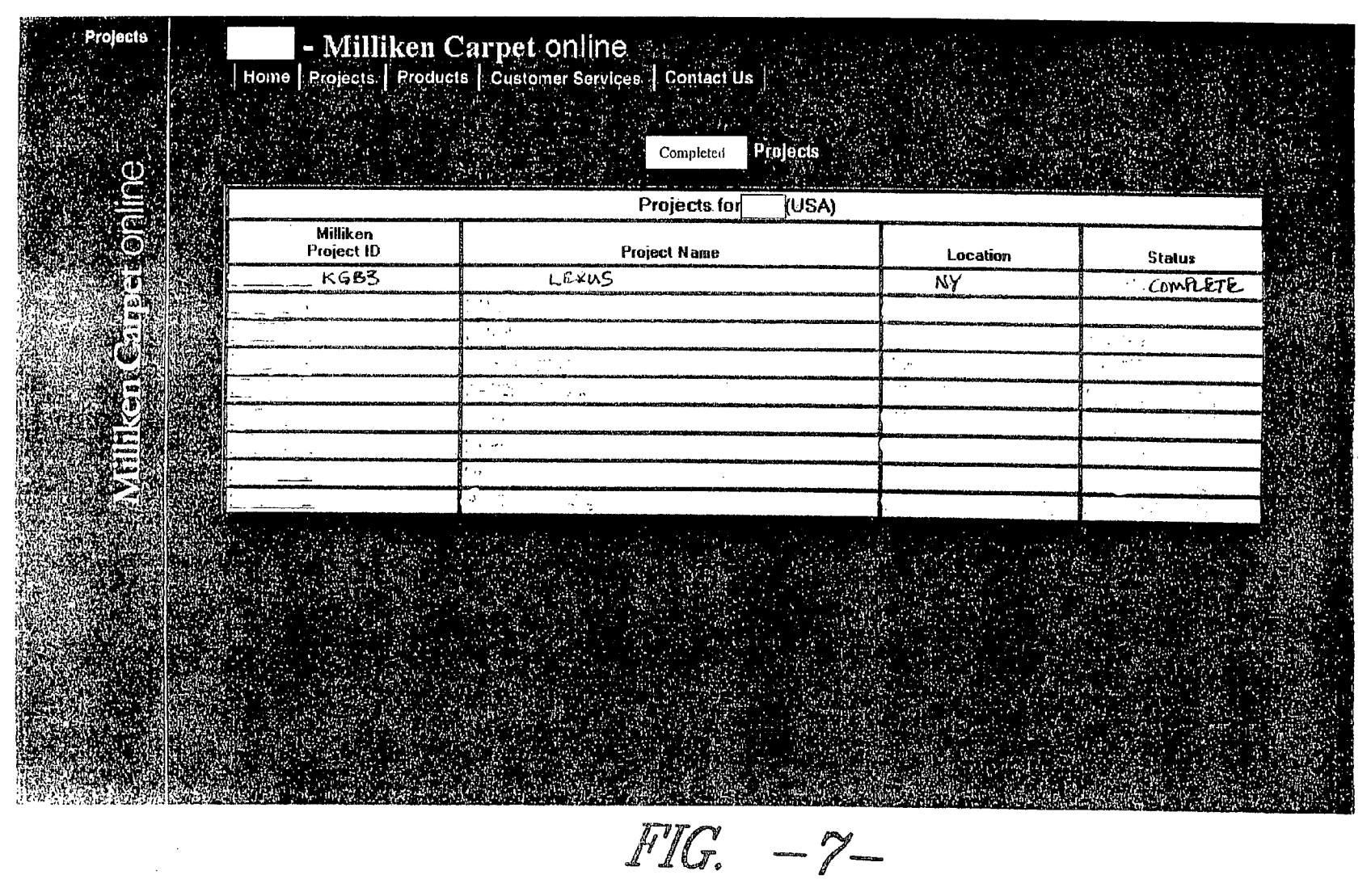

FIG. 7 is a representation of a screen display illustrating an HTML document detail page listing completed projects;

FIG. 8A and 8B are representations of screen displays for entry of new project information;

FIGS. 9A and 9B are representations of screen displays illustrating the proposal request function;

FIG. 10 is a representation of a screen display illustrating an HTML contact page document linked to the customer specific request page;

FIGS. 11–23 are representations of screen displays illustrating HTML documents corresponding to general information, products, services, and the like;

FIGS. 24–28 represent screen displays in accordance with another embodiment of the present invention and illustrate respectively the Products, View a Room Scene, View Installation Photo, View Product Specification, and Order a Sample of the Product functionality of the system;

FIGS. 29–36 represent screen displays in accordance with another embodiment of the system of the present invention;

FIG. 29 represents a log on screen display;

FIG. 30 represents a customer specific web site;

FIG. 31 represents a screen display with projects list;

FIG. 32 represents a screen display with particular project details;

FIG. 33 represents a screen display with project notes;

FIG. 34 represents a screen display with an activity report;

FIG. 35 represents a screen display with product samples; and

FIG. 36 represents a screen display with product specifications.

While the invention has been illustrated and broadly described above and will hereinafter be described in connection with certain potentially preferred embodiments and practices, it is to be understood that in no event is the invention limited to such illustrated and described embodiments and practices. On the contrary, it is intended that the present invention shall extend to all alternatives and modifications as may embrace the general principles of this invention within the true spirit and scope thereof.

DETAILED DESCRIPTION OF THE INVENTION

To facilitate a complete understanding of the invention, the following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on a computer of a user; the program which responds to browser requests by serving Web pages is commonly referred to as a "Web server."

Hyperlink. A navigational link from one document to another, or from one portion (or component) of a document to another. Typically, a hyperlink is displayed as a highlighted word or phrase that can be selected by clicking on it using a mouse to jump to the associated document or documented portion.

Internet. A collection of interconnected (public and/or private) networks that are linked together by a set of standard protocols (such as TCP/IP, HTTP and HTTPS) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP or HTTPS, and the Web pages are encoded using HTML. However, the terms "Web" and "World Wide Web" are intended to encompass present and future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "MILLIKEN.COM," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users.

HTML (HyperText Markup Language). A standard coding convention and set of codes for attaching presentation and linking attributes to informational content within documents. During a document authoring stage, the HTML codes (referred to as "tags") are embedded within the informational content of the document. When the Web document (or HTML document) is subsequently transferred from a Web server to a browser, the codes are interpreted by the browser and used to parse and display the document. Additionally in specifying how the Web browser is to display the document, HTML tags can be used to create links to other Web documents (commonly referred to as "hyperlinks").

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL. HTTPS (HyperText Transport Protocol Secured) is used for access to a secured server. HTTPS uses SSL (Secured Sockets Layer) to encrypt the data and may provide user authentication.

URL (Uniform Resource Locator). A unique address which fully specifies the location of a file or other resource on the Internet. The general format of a URL is protocol:// machine address:port/path/filename. The port specification is optional, and if none is entered by the user, the browser defaults to the standard port for whatever service is specified as the protocol.

Turning now to the drawings, FIG. 1 illustrates the general architecture of an interactive data retrieval and/or transfer system for floor covering installations and products that operates in accordance with an exemplary embodiment the present invention. The system includes a customer computer 110 and a supplier Web site 120 which are linked together via the Internet 125. It is contemplated that the customer computer 110 may be any type of computing device which allows a user ("customer") to interactively browse Web sites via a Web browser 126. By way of example only, and not limitation, the customer computer 110 may be a personal computer (PC) that runs a Windows operating system. The Web browser 126 may be Netscape's Navigator, Microsoft's Internet Explorer or such other Web browser as may be known to those of skill in the art.

The supplier Web site 120 is a site that provides various functions to allow a user to track the progress of specific floor covering installation projects as well as to obtain quotations for new products, order products, and send and receive messages relating to business transactions between the customer and the floor covering manufacturer, provider, or supplier. Typically, this site will be operated by the floor covering manufacturer (referred to herein as the "supplier") that has established a cooperative relationship with the customer. The customer is typically a corporate or business entity having multiple physical locations and numerous managerial employees including employees responsible for making decisions concerning the selection and installation of floor coverings in various new and preexisting corporate facilities. However, the customer may likewise be an individual purchasing floor covering materials for his or her personal use or a professional such as a designer, architect, or facility manager collecting information on behalf of a third party client. Thus, the term "customer" as used herein is intended to refer to a buying entity and the term "user" is intended to relate to a person using the system to access or communicate information.

Prior to use of the system, it is contemplated that representatives of the customer and the supplier will establish a listing of authorized users or classes of users who will have access to the system. The customer and the supplier will likewise establish the types and/or scope of information to which each of the identified users or class of users will have access. Accordingly, by way of example only, one identified user or class of user may have access to information relating to projects in a certain geographic region while another identified user or class of user will have access to information relating to projects on a global basis. Certain other users may have access only to general product information without access to information on any particular project. Also, certain users may not have authority to order products.

According to the potentially preferred form of the invention, each individual user is provided with personalized registration information, such as a registration number and personalized identification ID, or user ID and password, which must be entered upon accessing the system. Based upon that registration number and ID or user ID and password, the user is linked to a dedicated URL for the specific customer. The user is thereafter supplied with only such requested information as has been previously authorized by the customer and communicated to the supplier.

In operation, the user accesses the supplier Web site 120 through the supplier's Web server 130. The Web server 130 links the user to the customer specific URL 132 for access to a registry of HTML documents making up a catalog of project and product data or specific documents which can be requested, retrieved, and viewed by the customer via the Web browser 126. Alternatively, programmatic functions can retrieve data from a database and programmatically create the HTML page to display the data. These HTML documents preferably include a customized customer specific request page (FIG. 3) which may include general information relating to the relationship between the customer and the supplier as well as information of a general nature on products and services available from the supplier. The customer specific request page is preferably pulled up automatically upon log in by the user once an appropriate registration number and I.D. has been entered. As shown, the customer specific request page preferably includes a number of buttons to establish hyperlinks to further information. The buttons can provide hyperlinks, URL links, or other program function calls. In one particular example, the supplier Web site 120 uses HTML, Lotus Script and Java Script.

As illustrated, according to one potentially preferred form of the invention, the customer specific request page includes hyperlinks or access to information, databases, pages or sets of pages relating to projects, products, and customer services as well as a hyperlink to a contact page at which a question or message may be left.

According to the potentially preferred embodiment, upon accessing the project hyperlink, the user is provided with a plurality of options including the options to review active projects, view completed projects, enter a new project, or request a proposal (FIG. 5). Sample screens to view active and completed projects are illustrated in FIGS. 6 and 7. Sample screens to enter data for a new project is provided in FIGS. 8A and 8B. A screen corresponding to a request for a proposal for floor covering material is set forth at FIGS. 9A and 9B. A sample contact screen is provided at FIG. 10.

As indicated previously, according to the preferred form of the invention, the access to information is controlled such that any individual user will have access to only such information as has been previously authorized by the customer. The retrieval, filtration (parsing) and display of such preauthorized information is controlled via a computer program 140. As illustrated, the computer program is linked to one or more databases 150 of sortable and retrievable customer specific information. The computer program may also be linked to an order cart 160 to track orders placed by the customer on a historical basis.

Certain users will only have access to general information such as shown, for example, in FIGS. 11–23.

In operation, upon the user accessing the customer specific request page and making a request, the computer program retrieves data corresponding to the request which has been preauthorized for dissemination to that particular user. Recognition of the user is achieved by correlation to the previously entered registration number and I.D. supplied by the user. Thus, in the example illustrated in FIG. 6, the user is authorized to view active project information on two projects which are listed. It is contemplated that each project listing may be hyperlinked to yet additional information for that particular project including by way of example only, manufacturing schedules, shipping information, delivery data, installation schedules and contact names for responsible persons. However, at each stage of data retrieval, the computer program 140 serves to filter through only such information that has been preauthorized for communication to the particular user.

It is contemplated that the database of customer specific information 150 will be maintained by the supplier on a substantially continuous basis using interactive software such as Lotus Notes, for example, Sales Notes, or the like. In this manner a responsible sales representative for the particular installation may enter pertinent data directly into the database. Of course such entry is in a format to permit accessibility and filtration by the computer program 140.

In accordance with one particular example of the invention, the site is accessed via HTTPS which is used for access to a secured server and uses SSL (Secured Sockets Layer) which encrypts the data.

The Links or Buttons that appear as hyperlinks may go to specific documents or list of documents or is a programmatic function that will retrieve data from a database and programmatically create the HTML page to display the data. Behind the buttons, there may be hyperlinks, URL links, or other program function calls. In one example, the site uses HTML, LotusScript, and JavaScript.

In one example, the published document content under Customer Service is created in a Lotus Notes database and a Lotus Domino/Notes server generates the HTML page on the fly to display in the Web browser.

In another example, the Product Catalog is data that is stored in a Catalog Notes database. The design images, room scenes, and installation photos are all stored in a separate Image Library Notes database. The product specifications are also in their own Product Specs Notes database. All are linked by the product key to display the appropriate information on the page once a product is found or selected.

In still another example, when the user places an order, the link uses a program function to send a transaction to IMS on a mainframe. The order number that is returned is the only thing stored in the Notes database in order to use that field to later view the current or previous orders. To do an order inquiry to current or previous, a program function is used on a Domino server, and the LotusScript program does a direct call to the relational database on the mainframe to retrieve the order status information to be displayed using HTML on the screen.

In still yet another example, the Projects button programmatically retrieves data from a Web Sales Notes Notes database. The Web Sales Notes Notes database is a subset of project information that is updated nightly from the internal sales Notes Notes database that the business uses internally with its sales associates.

In still another example, the Contact button programmatically displays an input form that is contained in a separate Contact Us Notes database used just for the question and answer functionality.

An example of a Products functionality is shown in FIGS. 24–28.

An example of an alternative web site system is shown in FIGS. 29–36.

In at least one embodiment, the present system provides authorized users at least limited access to certain secure data or information any time of day or night from virtually any location having Internet access. This convenience facilitates expansion of global or international accounts and enhances customer satisfaction.

It is, of course, to be understood that a wide range of alternatives and modifications to the embodiment of the present invention as set forth above may exist. For example, a customer may request that their outside employed corporate designer or architect have access to project information so that all actions taken by the designer or architect with regard to the carpeting and selection thereof will be added to the file notes so that the customer can read all progress in one place. Similarly, a customer may ask that their outsourced facility management company (FM) who runs and manages their buildings for them for a fee under contract have access to their project information. Thus, while the present invention has been illustrated and described in relation to potentially preferred embodiments, procedures and practices, it is to be understood that such embodiments, procedures and practices are illustrative only and that the present invention is in no event to be limited thereto. Rather, it is contemplated that modifications and variations embodying the principles of the present invention may occur to those of skill in the art. It is therefore contemplated and intended that the present invention shall extend to all such modifications and variations as may incorporate the broad principles of the present invention within the full spirit and scope thereof.

What is claimed is:

1. A method of providing project and product information to a corporate purchaser of floor covering materials using an internet-based Web site system, the method comprising:

providing a Web site system that includes a Web site accessible through a computer based server that includes a link to a customer specific URL and that includes an accessible database containing data including a catalog of project and product data corresponding to floor covering installation projects for said corporate purchaser of floor covering materials;

identifying one or more users authorized to access the Web site of the Web site system on behalf of said corporate purchaser of floor covering materials;

assigning to said one or more users personalized registration information in said database;

establishing a category based listing of data elements accessible by each of said one or more users in said database;

in response to an entry of personalized registration information from a remote computing device by an individual user, linking said individual user to said customer specific URL by system software;

receiving a request for floor covering installation project data from said individual user from the remote computing device;

correlating the entered registration information to the listing of data elements accessible by said individual user by system software;

retrieving a portion of the requested project data corresponding to the listing of data elements accessible by said individual user from said database; and transmitting to said remote computing device of the individual user in electronic format said portion of the requested project data corresponding to the listing of data elements accessible by said individual user while excluding data elements not accessible by said individual user, wherein said corporate purchaser of floor covering materials is a corporate entity having a plurality of business locations, wherein the catalog of project and product data includes data on any active floor covering installation projects, wherein the catalog of project and product data includes data on any completed floor covering installation projects, and wherein the customer specific URL further includes a link to an order page for said individual user to place an order with a manufacturer of said floor covering materials by a remote computing device, and wherein the order pane is linked to a listing of floor covering materials preauthorized by said corporate purchaser of floor covering materials such that the order placed by the individual user is limited to such preauthorized floor covering materials.

2. The method as recited in claim 1, wherein in the "establishing" step, the category based listing of data elements accessible by each of said one or more users is arranged on the basis of geographic location of the floor covering installation projects.

3. The method as recited in claim 1, further comprising updating project data during the progression of the floor covering installation projects by entry of additional information into a database specific to said corporate purchaser of floor covering materials.

4. The method as recited in claim 3, wherein entry of additional information into the database specific to said corporate purchaser of floor covering materials is carried out by means of a remote data entry system by a representative of a manufacturer of said floor covering material.

5. The method as recited in claim 1, wherein the customer specific URL further includes a link to means to request quotations for new floor covering installations.

6. The method as recited in claim 1, wherein the customer specific URL further includes a link to a contact page for said individual user to communicate information or messages to a manufacturer of said floor covering materials.

7. The method as recited in claim 1, wherein the Web site system is provided by a manufacturer of floor covering materials.

8. The method as recited in claim 1, wherein the listing of floor covering materials preauthorized by said corporate purchaser is a user specific listing such that different floor covering materials are preauthorized for order by different individual users.

9. The method as recited in claim 1, wherein the system further generates invoicing and collection data for said corporate purchaser of floor covering materials.

10. A method of providing project and product information to a corporate purchaser of floor covering materials using an internet-based Web site system, the method comprising:

providing a Web site system that includes a Web site accessible through a computer based server that includes a link to a customer specific URL and that includes an accessible database containing data including a catalog of project and product data corresponding to floor covering installation projects for said corporate purchaser of floor covering materials, wherein the Web site is provided by a manufacturer of said floor covering materials and wherein said floor covering materials are selected from a group consisting of carpet and carpet tile;

the corporate purchaser and the manufacturer of said floor covering materials identifying one or more users authorized to access the Web site system on behalf of said purchaser;

assigning to said one or more users a personalized registration code and ID;

establishing a listing of data elements from said database accessible by each of said one or more users;

in response to an entry of a personalized registration code and ID by an individual user via a remote computing device, linking said individual user to said customer specific URL;

receiving a request for floor covering installation project data from said individual user;

correlating the entered registration code and ID to the listing of data elements accessible by said individual user;

retrieving a portion of the requested project data corresponding to the listing of data elements accessible by said individual user; and transmitting to said individual user in electronic format said portion of the requested project data corresponding to the listing of data elements accessible by said individual user while excluding data elements not accessible by said individual user, wherein said corporate purchaser of floor covering materials is a corporate entity having a plurality of business locations, wherein the catalog of project and product data includes data on any active floor covering installation projects, wherein the catalog of project and product data includes data on any completed floor covering installation projects, wherein the customer specific URL further includes a link to an order page for said individual user to place an order with the manufacturer of said floor covering materials by a remote computing device, and wherein the order page is linked to a listing of floor covering materials preauthorized by said corporate purchaser of floor covering materials such that the order placed by the individual user is limited to such preauthorized floor covering materials.

11. The method as recited in claim 10, wherein in the "establishing" step, the listing of data elements accessible by each of said one or more users is arranged on the basis of geographic location of the floor covering installation projects.

12. The method as recited in claim 10, further comprising updating project data during the progression of the floor covering installation projects by entry of additional information into a database specific to said purchaser of floor covering materials.

13. The method as recited in claim 12, wherein entry of additional information into the database specific to said corporate purchaser of floor covering materials is carried out by means of a remote data entry system by a representative of the manufacturer of said floor covering materials.

14. The method as recited in claim 10, wherein the customer specific URL further includes a link to means to submit directly to the manufacturer of said floor covering materials a request for quotation (RFQ) for new floor covering installations.

15. The method as recited in claim 10, wherein the customer specific URL further includes a link to a contact page for said individual user to communicate information or messages to the manufacturer of said floor covering materials.

16. The method as recited in claim 10, wherein the listing of floor covering materials preauthorized by said corporate purchaser is a user specific listing such that different floor covering materials are preauthorized for order by different individual users.

17. The method as recited in claim 10, wherein the system further generates invoicing and collection data for said corporate purchaser of floor covering materials.

* * * * *